United States Patent
Takeda et al.

(10) Patent No.: US 9,763,240 B2
(45) Date of Patent: Sep. 12, 2017

(54) BLIND DECODING METHOD, RADIO BASE STATION, USER TERMINAL AND RADIO COMMUNICATION SYSTEM

(71) Applicant: NTT DOCOMO, INC., Tokyo (JP)

(72) Inventors: Kazuaki Takeda, Tokyo (JP); Qin Mu, Beijing (CN); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 72 days.

(21) Appl. No.: 14/399,982

(22) PCT Filed: May 10, 2013

(86) PCT No.: PCT/JP2013/063156
§ 371 (c)(1),
(2) Date: Nov. 10, 2014

(87) PCT Pub. No.: WO2013/168794
PCT Pub. Date: Nov. 14, 2013

(65) Prior Publication Data
US 2015/0117353 A1 Apr. 30, 2015

(30) Foreign Application Priority Data

May 11, 2012 (JP) .................. 2012-109900
Aug. 1, 2012 (JP) .................. 2012-171243

(51) Int. Cl.
*H04W 72/04* (2009.01)
*H04B 7/06* (2006.01)
*H04L 5/00* (2006.01)

(52) U.S. Cl.
CPC ........ *H04W 72/042* (2013.01); *H04B 7/0617* (2013.01); *H04B 7/0619* (2013.01);
(Continued)

(58) Field of Classification Search
CPC ........... H04W 72/042; H04W 72/1289; H04W 72/1294; H04W 74/006; H04L 1/0045; H04L 5/0091–5/0094
See application file for complete search history.

(56) References Cited

U.S. PATENT DOCUMENTS

| | | | |
|---|---|---|---|
| 2013/0107816 A1* | 5/2013 | Iraji | H04W 72/042 370/329 |
| 2013/0194931 A1* | 8/2013 | Lee | H04W 72/04 370/241 |

(Continued)

FOREIGN PATENT DOCUMENTS

| | | |
|---|---|---|
| CN | 102404076 A | 4/2012 |
| WO | 2012/039102 A1 | 3/2012 |
| WO | 2012118269 A2 | 9/2012 |

OTHER PUBLICATIONS

International Search Report for corresponding International Application No. PCT/JP2013/063156, mailed Aug. 13, 2013 (1 page).

(Continued)

*Primary Examiner* — Pao Sinkantarakorn
(74) *Attorney, Agent, or Firm* — Osha Liang LLP

(57) ABSTRACT

The blind decoding method disclosed herein is a blind decoding method to allow a user terminal to blind-decode downlink control information that is transmitted from a radio base station using at least one of a legacy PDCCH and an enhanced PDCCH that is frequency-division-multiplexed with a PDSCH, and includes the steps in which the radio base station reports information for configuring a number of candidates, which information is used to configure numbers of search space candidates for the legacy PDCCH and numbers of search space candidates for the enhanced PDCCH, to the user terminal, and the user terminal blind-decodes the downlink control information based on the numbers of search space candidates for the legacy PDCCH (Continued)

and the numbers of search space candidates for the enhanced PDCCH that are configured based on the candidate quantity configuration information.

8 Claims, 25 Drawing Sheets

(52) U.S. Cl.
CPC .......... *H04L 5/0053* (2013.01); *H04L 5/0094* (2013.01); *H04L 5/0023* (2013.01)

(56) References Cited

U.S. PATENT DOCUMENTS

| | | | |
|---|---|---|---|
| 2013/0194956 A1* | 8/2013 | Sartori | H04W 72/0406 370/252 |
| 2014/0003349 A1 | 1/2014 | Kang et al. | |
| 2014/0086188 A1* | 3/2014 | Hoymann | H04L 5/0094 370/329 |
| 2014/0301341 A1 | 10/2014 | Pan | |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).

Office Action issued in corresponding Japanese Application No. 2012-171243, mailed Dec. 2, 2014 (6 pages).

Huawei, HiSilicon; "UE-specific search space for ePDCCH"; 3GPP TSG RAN WG1 Meeting #68bis, R1-120998; Jeju, Korea; Mar. 26-30, 2012 (5 pages).

Decison to Grant a Patent issued in corresponding Japanese Application No. 2012-171243, mailed Mar. 10, 2015 (5 pages).

Extended Search Report issued in corresponding European Application No. 13787369.1, mailed Dec. 4, 2015 (9 pages).

* cited by examiner

MAXIMUM NUMBER OF BLIND DECODING ATTEMPTS

| | PDCCH | | ePDCCH | | | TOTAL (60 FOR REL. 10) |
| | CSS | USS | eCSS | eUSS LOCALIZED & DISTRIBUTED | eUSS EITHER LOCALIZED OR DISTRIBUTED | |
|---|---|---|---|---|---|---|
| CASE 1a | 12 | 48 | – | 48(D) + 48(L) | – | 156 |
| CASE 1b | 12 | 48 | – | – | 48(D/L) | 108 |
| CASE 1c | 12 | – | – | 48(D) + 48(L) | – | 108 |
| CASE 1d | 12 | – | – | – | 48(D/L) | 60 |
| CASE 2a | 12 | 48 | 12 | 48(D) + 48(L) | – | 168 |
| CASE 2b | 12 | 48 | 12 | – | 48(D/L) | 120 |
| CASE 2c | 12 | – | 12 | 48(D) + 48(L) | – | 120 |
| CASE 2d | 12 | – | 12 | – | 48(D/L) | 72 |
| CASE 3a | – | 48 | 12 | 48(D) + 48(L) | – | 156 |
| CASE 3b | – | 48 | 12 | – | 48(D/L) | 108 |
| CASE 3c | – | – | 12 | 48(D) + 48(L) | – | 108 |
| CASE 3d | – | – | 12 | – | 48 | 60 |

FIG.6

| TYPE | AL | CANDIDATES | | |
|---|---|---|---|---|
| | | PDCCH | ePDCCH | |
| | | | SET 1 | SET 2 |
| CSS | 4 | a | 4−a | − |
| CSS | 8 | b | 2−b | − |
| USS | 1 | c | e | 6−c−e |
| USS | 2 | c | e | 6−c−e |
| USS | 4 | d | f | 2−d−f |
| USS | 8 | d | f | 2−d−f |

FIG.7A

| | MEANING | RANGE OF VALUE | |
|---|---|---|---|
| a | THE NUMBER OF CANDIDATES WITH 4 CCE IN PDCCH FOR CSS | IF eCSS IS SUPPORTED | {0, 1, 2, 3, 4} |
| | | IF eCSS IS NOT SUPPORTED | {4} |
| b | THE NUMBER OF CANDIDATES WITH 8 CCE IN PDCCH FOR CSS | IF eCSS IS SUPPORTED | {0, 1, 2} |
| | | IF eCSS IS NOT SUPPORTED | {2} |
| c | THE NUMBER OF CANDIDATES WITH 1 OR 2 CCE IN PDCCH FOR USS | IF R11 UE MONITOR BOTH PDCCH AND ePDCCH | {0, 1, 2, 3, 4, 5, 6} |
| | | IF R11 UE MONITOR ePDCCH ONLY | {0} |
| d | THE NUMBER OF CANDIDATES WITH 4 OR 8 CCE IN PDCCH FOR USS | IF R11 UE MONITOR BOTH PDCCH AND ePDCCH | {0, 1, 2} |
| | | IF R11 UE MONITOR ePDCCH ONLY | {0} |
| e | THE NUMBER OF CANDIDATES WITH 1 OR 2 CCE IN SET 1 FOR eUSS | IF R11 UE MONITOR BOTH SET 1 AND SET 2 | {0, 1, 2, 3, 4, 5, 6} |
| | | IF R11 UE MONITOR SET 1 ONLY | {6} |
| f | THE NUMBER OF CANDIDATES WITH 4 OR 8 CCE IN SET 1 FOR eUSS | IF R11 UE MONITOR BOTH SET 1 AND SET 2 | {0, 1, 2} |
| | | IF R11 UE MONITOR SET 1 ONLY | {2} |

FIG.7B

| TYPE | AL | CANDIDATES | | |
|---|---|---|---|---|
| | | PDCCH | ePDCCH SET 1 | ePDCCH SET 2 |
| CSS | 4 | a | 4-a | - |
| CSS | 8 | b | 2-b | - |
| USS | 1 | c | g | 6-c-g |
| USS | 2 | d | h | 6-d-h |
| USS | 4 | e | i | 2-e-i |
| USS | 8 | f | j | 2-f-j |

FIG.8A

| | MEANING | RANGE OF VALUE | |
|---|---|---|---|
| a | THE NUMBER OF CANDIDATES WITH 4 CCE IN PDCCH FOR CSS | IF eCSS IS SUPPORTED | {0, 1, 2, 3, 4} |
| | | IF eCSS IS NOT SUPPORTED | {4} |
| b | THE NUMBER OF CANDIDATES WITH 8 CCE IN PDCCH FOR CSS | IF eCSS IS SUPPORTED | {0, 1, 2} |
| | | IF eCSS IS NOT SUPPORTED | {2} |
| c | THE NUMBER OF CANDIDATES WITH 1 CCE IN PDCCH FOR USS | IF R11 UE MONITOR BOTH PDCCH AND ePDCCH | {0, 1, 2, 3, 4, 5, 6} |
| | | IF R11 UE MONITOR ePDCCH ONLY | {0} |
| d | THE NUMBER OF CANDIDATES WITH 2 CCE IN PDCCH FOR USS | IF R11 UE MONITOR BOTH PDCCH AND ePDCCH | {0, 1, 2, 3, 4, 5, 6} |
| | | IF R11 UE MONITOR ePDCCH ONLY | {0} |
| e | THE NUMBER OF CANDIDATES WITH 4 CCE IN PDCCH FOR USS | IF R11 UE MONITOR BOTH PDCCH AND ePDCCH | {0, 1, 2} |
| | | IF R11 UE MONITOR ePDCCH ONLY | {0} |
| f | THE NUMBER OF CANDIDATES WITH 8 CCE IN PDCCH FOR USS | IF R11 UE MONITOR BOTH PDCCH AND ePDCCH | {0, 1, 2} |
| | | IF R11 UE MONITOR ePDCCH ONLY | {0} |
| g | THE NUMBER OF CANDIDATES WITH 1 CCE IN SET 1 FOR eUSS | IF R11 UE MONITOR BOTH SET 1 AND SET 2 | {0, 1, 2, 3, 4, 5, 6} |
| | | IF R11 UE MONITOR SET 1 ONLY | {6} |
| h | THE NUMBER OF CANDIDATES WITH 2 CCE IN SET 1 FOR eUSS | IF R11 UE MONITOR BOTH SET 1 AND SET 2 | {0, 1, 2, 3, 4, 5, 6} |
| | | IF R11 UE MONITOR SET 1 ONLY | {6} |
| j | THE NUMBER OF CANDIDATES WITH 4 CCE IN SET 1 FOR eUSS | IF R11 UE MONITOR BOTH SET 1 AND SET 2 | {0, 1, 2} |
| | | IF R11 UE MONITOR SET 1 ONLY | {2} |
| k | THE NUMBER OF CANDIDATES WITH 8 CCE IN SET 1 FOR eUSS | IF R11 UE MONITOR BOTH SET 1 AND SET 2 | {0, 1, 2} |
| | | IF R11 UE MONITOR SET 1 ONLY | {2} |

FIG.8B $a = \lfloor 4*m \rfloor$
$b = \lfloor 2*m \rfloor$
$c = \lfloor 6*n \rfloor$
$d = \lfloor 2*n \rfloor$
$e = \lfloor 6-c \rfloor *n'$
$f = \lfloor 2-d \rfloor *n'$

| TYPE | AL | CANDIDATES | | |
|---|---|---|---|---|
| | | PDCCH | ePDCCH SET 1 | ePDCCH SET 2 |
| CSS | 4 | a | 4 – a | – |
| | 8 | b | 2 – b | – |
| USS | 1 | c | e | 6 – c – e |
| | 2 | c | e | 6 – c – e |
| | 4 | d | f | 2 – d – f |
| | 8 | d | f | 2 – d – f |

FIG.9A

| | MEANING | | RANGE OF VALUE | |
|---|---|---|---|---|
| m | RATIO OF CANDIDATES IN PDCCH FOR CSS | IF eCSS IS SUPPORTED | { 0, 0.25, 0.5, 0.75, 1 } | |
| | | IF eCSS IS NOT SUPPORTED | { 1 } | |
| n | RATIO OF CANDIDATES IN PDCCH FOR USS | IF R11 MONITOR BOTH PDCCH AND ePDCCH | { 0, 1/6, 1/3, 1/2, 2/3, 5/6, 1 } | |
| | | IF R11 MONITOR ONLY ePDCCH | { 0 } | |
| n' | RATIO OF CANDIDATES IN SET 1 FOR eUSS | IF R11 MONITOR BOTH SET 1 AND SET 2 | n = 1 | { 0 } |
| | | | n = 5/6 | { 0, 1 } |
| | | | n = 2/3 | { 0, 1/2, 1 } |
| | | | n = 1/2 | { 0, 1/3, 2/3, 1 } |
| | | | n = 1/3 | { 0, 1/4, 1/2, 3/4, 1 } |
| | | | n = 1/6 | { 0, 1/5, 2/5, 3/5, 4/5, 1 } |
| | | | n = 0 | { 0, 1/6, 1/3, 1/2, 2/3, 5/6, 1 } |
| | | IF R11 MONITOR SET 1 ONLY | { 1 } | |

FIG.9B

| | PDCCH | | E-PDCCH | | | TOTAL (W/O PROPOSED METHOD) | TOTAL (W PROPOSED METHOD) |
|---|---|---|---|---|---|---|---|
| | CSS | USS | eCSS | eUSS | | | |
| | | | | LOCALIZED & DISTRIBUTED | EITHER LOCALIZED OR DISTRIBUTED | | |
| CASE 1a (m=1, n=1/6, n'=1/5) | 12 | 6 | – | 6(D) + 36(L) | – | 156 | 60 |
| CASE 1b (m=1, n=1/6, n'=0 OR 1) | 12 | 6 | – | – | 42(D/L) | 108 | 60 |
| CASE 1c (m=1, n=0, n'=1/6) | 12 | – | – | 6(D) + 42(L) | – | 108 | 60 |
| CASE 1d (m=1, n=0, n'=0 OR 1) | 12 | 6 | – | – | 48(D/L) | 60 | 60 |
| CASE 2a (m=1/4, n=1/6, n'=1/5) | 3 | 6 | 9 | 6(D) + 36(L) | – | 168 | 60 |
| CASE 2b (m=1/4, n=1/6, n'=0 OR 1) | 3 | 6 | 9 | – | 42(D/L) | 120 | 60 |
| CASE 2c (m=1/4, n=0, n'=1/6) | 3 | – | 9 | 6(D) + 42(L) | – | 120 | 60 |
| CASE 2d (m=1/4, n=0, n'=0 OR 1) | 3 | 6 | 9 | – | 48(D/L) | 72 | 60 |
| CASE 3a (m=0, n=1/6, n'=1/5) | – | 6 | 12 | 6(D) + 36(L) | – | 156 | 60 |
| CASE 3b (m=0, n=1/6, n'=0 OR 1) | – | 6 | 12 | – | 42(D/L) | 108 | 60 |
| CASE 3c (m=0, n=0, n'=1/6) | – | – | 12 | 6(D) + 42(L) | – | 108 | 60 |
| CASE 3d (m=0, n=0, n'=0 OR 1) | – | – | 12 | – | 48(D/L) | 60 | 60 |

FIG.10

PATTERN 1

| TYPE | AL | CANDIDATES | | |
|---|---|---|---|---|
| | | PDCCH | ePDCCH | |
| | | | SET 1 | SET 2 |
| CSS | 4 | 4 | 0 | 0 |
| | 8 | 2 | 0 | 0 |
| USS | 1 | 0 | 6 | 0 |
| | 2 | 0 | 6 | 0 |
| | 4 | 0 | 2 | 0 |
| | 8 | 0 | 2 | 0 |

CASE: WHEN MULTI-USER MIMO IS USED
CSS ON PDCCH
USS ON ePDCCH

FIG.11

PATTERN 2

| TYPE | AL | CANDIDATES | | |
|---|---|---|---|---|
| | | PDCCH | ePDCCH | |
| | | | SET 1 | SET 2 |
| CSS | 4 | 0 | 4 | 0 |
| | 8 | 0 | 2 | 0 |
| USS | 1 | 0 | 6 | 0 |
| | 2 | 0 | 6 | 0 |
| | 4 | 0 | 2 | 0 |
| | 8 | 0 | 2 | 0 |

CASE: WHEN LEGACY PDCCH IS NOT AVAILABLE (NEW CARRIER TYPE)
CSS AND USS ON ePDCCH

FIG.12

PATTERN 3

| TYPE | AL | CANDIDATES | | |
|---|---|---|---|---|
| | | PDCCH | ePDCCH | |
| | | | SET 1 | SET 2 |
| CSS | 4 | 0 | 4 | 0 |
| | 8 | 0 | 2 | 0 |
| USS | 1 | 0 | 0 | 6 |
| | 2 | 0 | 0 | 6 |
| | 4 | 0 | 0 | 2 |
| | 8 | 0 | 0 | 2 |

CASE: WHEN LEGACY PDCCH IS NOT AVAILABLE (NEW CARRIER TYPE), AND WHEN SUBBAND CSI/PMI IS USED TO ACHIEVE BEAM-FORMING GAIN
    SET 1 DISTRIBUTED MAPPING
    SET 2 LOCALIZED MAPPING (THIS IS USEFUL FOR BEAMFORMING)

FIG.13

PATTERN 4-1

| TYPE | AL | CANDIDATES | | |
|---|---|---|---|---|
| | | PDCCH | ePDCCH | |
| | | | SET 1 | SET 2 |
| CSS | 4 | 4 | 0 | 0 |
| | 8 | 2 | 0 | 0 |
| USS | 1 | 0 | 3 | 3 |
| | 2 | 0 | 3 | 3 |
| | 4 | 0 | 1 | 1 |
| | 8 | 0 | 1 | 1 |

PATTERN 4-2

| TYPE | AL | CANDIDATES | | |
|---|---|---|---|---|
| | | PDCCH | ePDCCH | |
| | | | SET 1 | SET 2 |
| CSS | 4 | 4 | 0 | 0 |
| | 8 | 2 | 0 | 0 |
| USS | 1 | 0 | 4 | 2 |
| | 2 | 0 | 4 | 2 |
| | 4 | 0 | 1 | 1 |
| | 8 | 0 | 1 | 1 |

<u>CASE: TO USE PDSCH AND EPDCCH EFFICIENTLY</u>
NUMBER OF UEs IS SMALL  ONLY SET 1
NUMBER OF UEs IS LARGE  BOTH SET 1 AND 2

FIG.14

PATTERN 4'-1

| TYPE | AL | CANDIDATES | | |
|---|---|---|---|---|
| | | PDCCH | ePDCCH | |
| | | | SET 1 | SET 2 |
| CSS | 4 | 4 | 0 | 0 |
| | 8 | 2 | 0 | 0 |
| USS | 1 | 0 | 6 | 3 |
| | 2 | 0 | 6 | 3 |
| | 4 | 0 | 2 | 1 |
| | 8 | 0 | 2 | 1 |

PATTERN 4'-2

| TYPE | AL | CANDIDATES | | |
|---|---|---|---|---|
| | | PDCCH | ePDCCH | |
| | | | SET 1 | SET 2 |
| CSS | 4 | 4 | 0 | 0 |
| | 8 | 2 | 0 | 0 |
| USS | 1 | 0 | 6 | 6 |
| | 2 | 0 | 6 | 6 |
| | 4 | 0 | 2 | 2 |
| | 8 | 0 | 2 | 2 |

CASE: IF THE UE HAS A HIGHER CAPABILITY IN BLIND DECODING, THE NUMBER OF CANDIDATES CAN BE INCREASED

FIG.15

PATTERN 5

| TYPE | AL | CANDIDATES |||
| --- | --- | --- | --- | --- |
| | | PDCCH | ePDCCH ||
| | | | SET 1 | SET 2 |
| CSS | 4 | 4 | 0 | 0 |
| | 8 | 2 | 0 | 0 |
| USS | 1 | 0 | 8 | 0 |
| | 2 | 0 | 8 | 0 |
| | 4 | 0 | 0 | 0 |
| | 8 | 0 | 0 | 0 |

CASE: WHEN THE UE IS IN A GOOD CONDITION WITH HIGH SNR, ONLY SMALL AGGREGATION LEVEL IS NEEDED

FIG.16

| TYPE | CANDIDATES |||
| --- | --- | --- | --- |
| | PDCCH | ePDCCH ||
| | | SET 1 | SET 2 |
| AGGREGATIONLEVEL | FORMAT X | FORMAT Y | FORMAT Z |
| 1 | 6 | 6 | 6 |
| 2 | 6 | 6 | 6 |
| 4 | 2 | 2 | 2 |
| 8 | 2 | 2 | 2 |

FIG.17

BLIND DECODING METHOD, RADIO BASE STATION, USER TERMINAL AND RADIO COMMUNICATION SYSTEM

TECHNICAL FIELD

The present invention relates to a blind decoding method, a radio base station, a user terminal and a radio communication system in a next-generation radio communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-Advanced" or "LTE enhancement" (hereinafter referred to as "LTE-A")) are under study for the purpose of achieving further broadbandization and increased speed beyond LTE. In LTE (Rel. 8) and LTE-A (Rel. 9 and Rel. 10), MIMO (Multi-Input Multi-Output) techniques are under study as radio communication techniques to transmit and receive data using a plurality of antennas, and improve spectral efficiency. According to MIMO techniques, a plurality of transmitting/receiving antennas are provided in a transmitter/receiver, so that different transmission information sequences are transmitted from different transmitting antennas at the same time.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in LTE-A, which is a successor system of LTE, multiple-user MIMO (MU-MIMO) transmission to send transmission information sequences from different transmitting antennas to different users simultaneously, is under study. This MU-MIMO transmission is also applied to a HetNet (Heterogeneous Network) and CoMP (Coordinated Multi-Point) transmission.

In future systems, the capacity of downlink control channels to transmit downlink control information is expected to run short, due to an increase in the number of users to be connected to a radio base station apparatus. Consequently, there is a threat that conventional radio resource allocation methods fail to optimize the characteristics of future systems such as typified by MU-MIMO transmission.

As a solution to this problem, a method of expanding the radio resource region for downlink control channels and transmitting more downlink control information may be possible. In this case, how to configure the number of search space candidates to use in the blind decoding of downlink control information becomes a problem.

The present invention has been made in view of the above, and it is therefore an object of the present invention to provide a blind decoding method, a radio base station, a user terminal and a radio communication system to allow a user terminal to blind-decode downlink control information with an adequate number of search space candidates when the radio resource region for downlink control channels is expanded.

Solution to Problem

The blind decoding method of the present invention is a blind decoding method to allow a user terminal to blind-decode downlink control information that is transmitted from a radio base station using at least one of a downlink control channel and an enhanced downlink control channel that is frequency-division-multiplexed with a downlink shared data channel, and this blind decoding method has the steps in which: the radio base station reports information for configuring the number of candidates, which information is used to configure the user terminal with numbers of search space candidates with respect to the downlink control channel and numbers of search space candidates with respect to the enhanced downlink control channel, to the user terminal; and the user terminal blind-decodes the downlink control information based on the numbers of search space candidates for the downlink control channel and the numbers of search space candidates for the enhanced downlink control channel that are configured based on the information for configuring the number of candidates.

The radio base station of the present invention is a radio base station that transmits downlink control information for a user terminal using at least one of a downlink control channel and an enhanced downlink control channel that is frequency-division-multiplexed with a downlink shared data channel, and this radio base station has: a generating section that generates information for configuring the number of candidates that is used to configure the number of search space candidates for the downlink control channel and the number of search space candidates for the enhanced downlink control channel; and a reporting section that reports the information for configuring the number of candidates generated by the generating section to the user terminal.

The user terminal of the present invention is a user terminal that blind-decodes downlink control information that is transmitted from a radio base station using at least one of a downlink control channel and an enhanced downlink control channel that is frequency-division-multiplexed with a downlink shared data channel, and this user terminal has: a receiving section that receives information for configuring the number of candidates that is used to configure the number of search space candidates for the downlink control channel and the number of search space candidates for the enhanced downlink control channel, from the radio base station; and a blind decoding section that blind-decodes the downlink control information based on the number of search space candidates for the downlink control channel and the number of search space candidates for the enhanced downlink control channel that are configured based on the information for configuring the number of candidates.

The radio communication system of the present invention is a radio communication system to allow a user terminal to blind-decode downlink control information that is transmitted from a radio base station using at least one of a downlink control channel and an enhanced downlink control channel that is frequency-division-multiplexed with a downlink shared data channel, and in this radio communication system, the radio base station reports information for configuring the number of candidates, which is used to configure numbers of search space candidates with respect to the downlink control channel and numbers of search space candidates with respect to the enhanced downlink control channel, to the user terminal; and the user terminal blind-decodes the downlink control information based on the numbers of search space candidates for the downlink control channel and the numbers of search space candidates for the enhanced downlink control channel that are configured based on the information for configuring the number of candidates.

Advantageous Effects of Invention

According to the present invention, it is possible to provide a blind decoding method, a radio base station, a user terminal and a radio communication system to allow a user terminal to blind-decode downlink control information with an adequate number of search space candidates when the radio resource region for downlink control channels is expanded.

BRIEF DESCRIPTION OF DRAWINGS

FIG. 6 is a diagram to show the number of times of blind decoding when DCI is transmitted using at least one of a legacy PDCCH and an enhanced PDCCH;

FIG. 7A is a diagram to show an example configuration of the number of CSS candidates and the number of USS candidates according to a first example;

FIG. 7B is a diagram to show the content of information for configuring the number of candidates (candidate quantity configuration information) according to the first example;

FIG. 8A is a diagram to show another example configuration of the number of CSS candidates and the number of USS candidates according to the first example;

FIG. 8B is a diagram to show the content of information for configuring the number of candidates according to the first example;

FIG. 9A is a diagram to show an example configuration of the number of CSS candidates and the number of USS candidates according to a second example;

FIG. 9B is a diagram to show the content of information for configuring the number of candidates according to the second example;

FIG. 10 is a diagram to show the number of times of blind decoding based on the number of CSS candidates and the number of USS candidates according to the second example;

FIG. 11 is a diagram to show examples of combinations of numbers of CSS candidates and numbers of USS candidates according to a third example;

FIG. 12 is a diagram to show examples of combinations of numbers of CSS candidates and numbers of USS candidates according to the third example;

FIG. 13 is a diagram to show examples of combinations of numbers of CSS candidates and numbers of USS candidates according to the third example;

FIG. 14 provides diagrams to show examples of combinations of numbers of CSS candidates and numbers of USS candidates according to the third example;

FIG. 15 provides diagrams to show examples of combinations of numbers of CSS candidates and numbers of USS candidates according to the third example;

FIG. 16 is a diagram to show examples of combinations of numbers of CSS candidates and numbers of USS candidates according to the third example;

FIG. 17 is a diagram to show examples of combinations of numbers of CSS candidates and numbers of USS candidates according to a fourth example;

DESCRIPTION OF EMBODIMENTS

Figure 1:
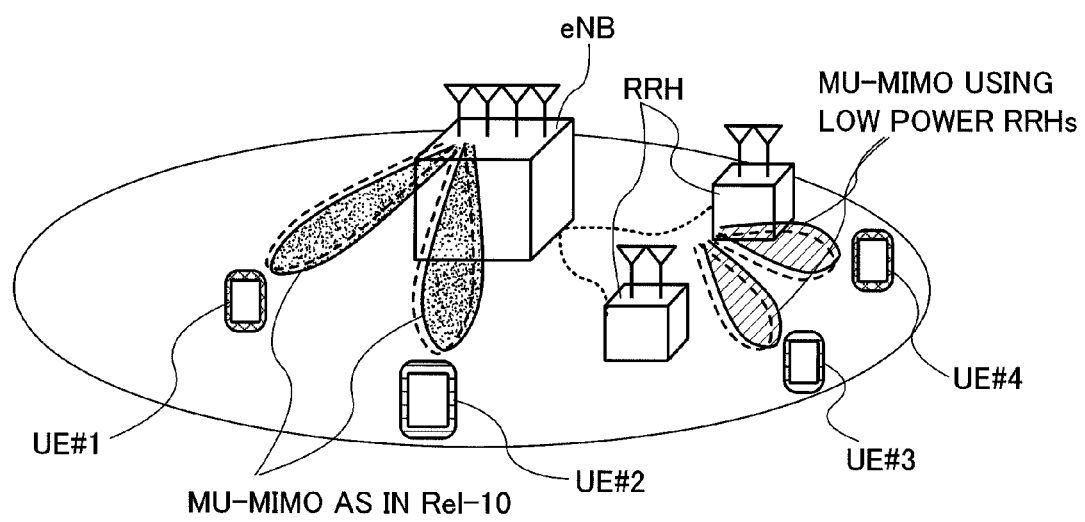
FIG. 1 is a schematic diagram of a HetNet where MU-MIMO is applied.

FIG. 1 is a diagram to show an example of a HetNet where MU-MIMO transmission is applied. The system shown in FIG. 1 is structured in layers, by providing small base stations (for example, RRHs (Remote Radio Heads)) having local coverage areas in the coverage area of a radio base station (for example, eNB (eNodeB)). In downlink MU-MIMO transmission in this system, data for a plurality of user terminal UEs (User Equipment) #1 and #2 is transmitted at the same time from a plurality of antennas of the radio base station. Also, from a plurality of antennas of a plurality of small base stations, data for a plurality of user terminal UEs #3 and #4 is transmitted simultaneously.

Figure 2:
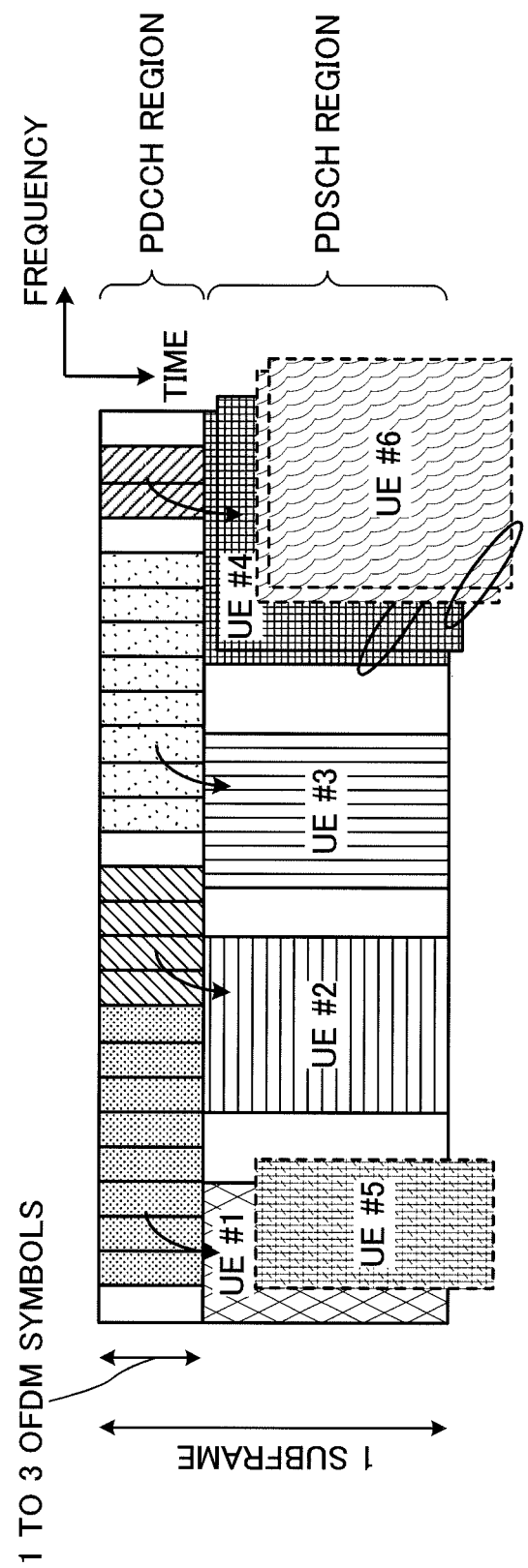
FIG. 2 is a diagram to show an example of a subframe where downlink MU-MIMO transmission is performed.

FIG. 2 is a diagram to show an example of a radio frame (for example, one subframe) where downlink MU-MIMO transmission is applied. As shown in FIG. 2, in a system where MU-MIMO transmission is applied, in each subframe, a predetermined number of OFDM symbols (covering maximum three symbols) from the top are secured as a radio resource region (PDCCH region) for a downlink control channel (PDCCH: Physical Downlink Control CHannel). Also, a radio resource region (PDSCH region) for a downlink shared data channel (PDSCH: Physical Downlink Shared CHannel) is secured in radio resources following the predetermined number of symbols from the subframe top.

In the PDCCH region, downlink control information (hereinafter referred to as "DCI") for user terminal UEs (here, UEs #1 to #4) is allocated. The DCI includes data allocation information for the user terminal UEs in the PDSCH region. For example, in FIG. 2, user terminal UE #2 receives the data for user terminal UE #2 allocated to the PDSCH region based on the DCI for user terminal UE #2 allocated to the PDCCH region.

Also, in MU-MIMO transmission, it is possible to transmit data to a plurality of user terminal UEs in the same time and in the same frequency. Consequently, in the PDSCH region of FIG. 2, it may be possible to multiplex data for user terminal UE #1 and data for user terminal UE #5 over the same frequency region. Similarly, it may be also possible to multiplex data for user terminal UE #4 and data for user terminal UE #6 over the same frequency region.

However, as shown in FIG. 2, even when an attempt is made to allocate data for user terminal UEs #1 to #6 in the PDSCH region, cases might occur where the region for allocating DCI for all of user terminal UEs #1 to #6 cannot be secured in the PDCCH region. For example, in the PDCCH region of FIG. 2, the DCI for user terminal UEs #5 and #6 cannot be allocated. In this case, the number of user terminal UEs to multiplex over the PDSCH region is limited due to the shortage of the PDCCH region for allocating DCI, and therefore there is a threat that it is not possible to achieve, sufficiently, the effect of improving the efficiency of use of radio resources by MU-MIMO transmission.

As a method to solve this shortage of the PDCCH region, it may be possible to expand the PDCCH allocation region outside maximum three OFDM symbols from the top of a subframe (that is, extend the PDCCH region into the conventional PDSCH region from the fourth OFDM symbol onward). As for the method of extending the PDCCH region, there are a method of time-division-multiplexing the PDSCH and the PDCCH in the conventional PDSCH region as shown in FIG. 3A (TDM approach), and a method of frequency-division-multiplexing the PDSCH and the PDCCH in the conventional PDSCH region as shown in FIG. 3B (FDM approach).

Figure 3A:
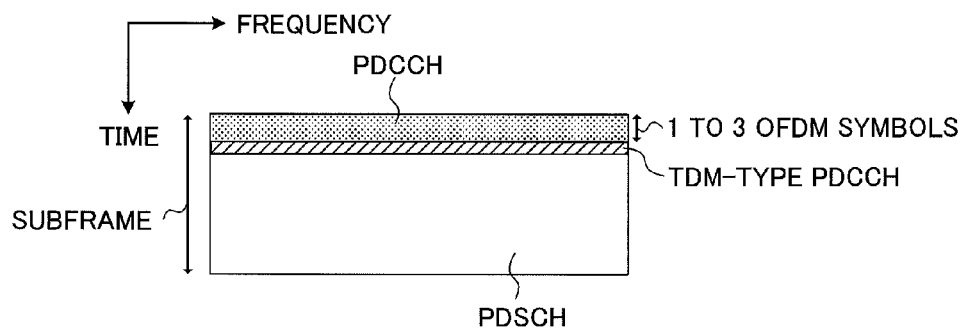
FIG. 3 provides diagrams to explain subframe structures of an enhanced PDCCH.
Figure 3B:
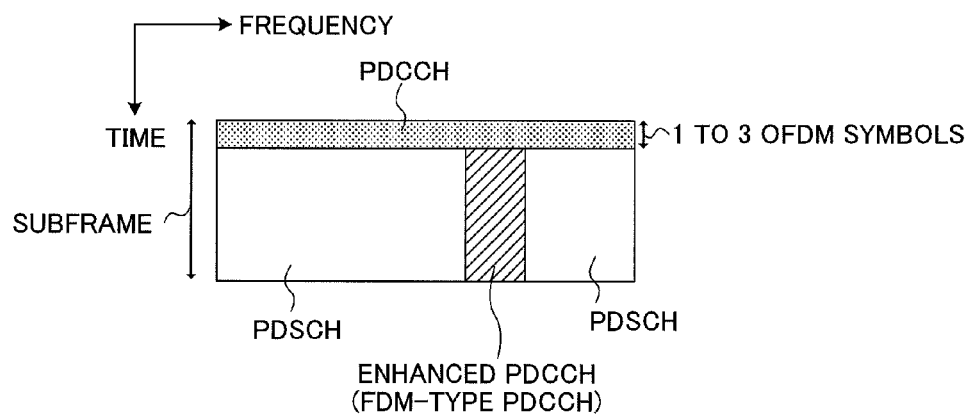

In the TDM approach shown in FIG. 3A, a PDCCH is placed over the entire system band in part of the OFDM symbols from the fourth OFDM symbol in the subframe. Meanwhile, in the FDM approach shown in FIG. 3B, a PDCCH is placed in part of the system band in all of the OFDM symbols from the fourth OFDM symbol in the subframe. This PDCCH, frequency-division-multiplexed with the PDSCH in the FDM approach, is demodulated using a demodulation reference signal (DM-RS), which is a user-specific reference signal. Consequently, DCI that is transmitted in this PDCCH can achieve beam-forming gain, like downlink data that is transmitted in the PDSCH does, and therefore is effective to increase the capacity of the PDCCH. In the future, it is expected that this FDM approach will gain greater importance.

Hereinafter, a PDCCH that is frequency-division-multiplexed with the PDSCH in the FDM approach will be referred to as an "enhanced PDCCH." This enhanced PDCCH may also be referred to as an "enhanced downlink control channel (enhanced physical downlink control channel)," "ePDCCH," "E-PDCCH," "FDM-type PDCCH," "UE-PDCCH," and so on. Also, the PDCCH that is placed in maximum three symbols from the top of a subframe will be referred to as the "legacy PDCCH." This legacy PDCCH may be referred to simply as the "downlink control channel (physical downlink control channel)" or "PDCCH."

Figure 4A:
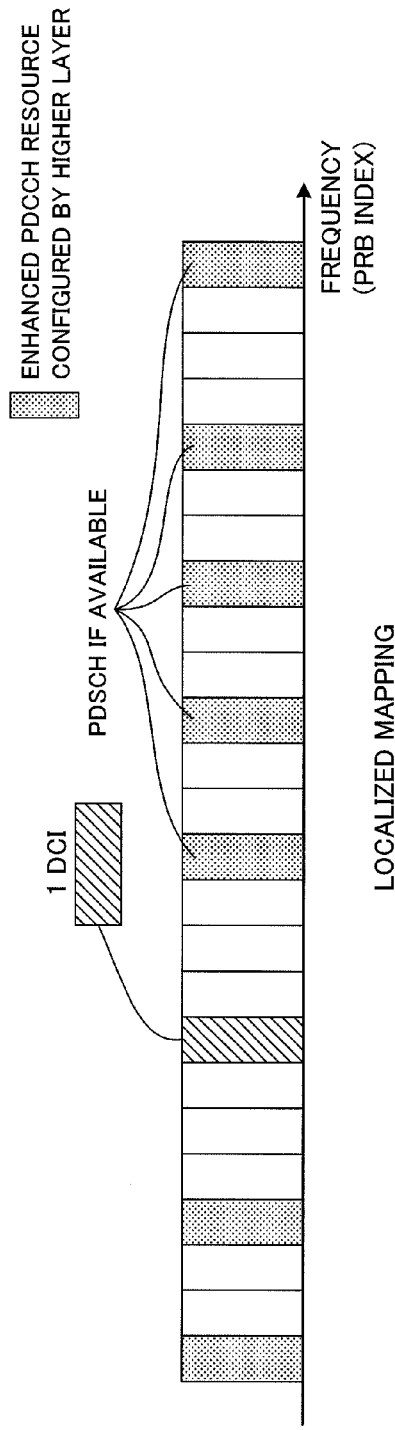
FIG. 4 provides diagrams to explain mapping methods of an enhanced PDCCH.

For enhanced PDCCHs in the FDM approach such as described above, localized mapping and distributed mapping are studied as DCI mapping methods. FIG. 4 provides diagrams to explain mapping methods of DCI in enhanced PDCCHs. FIG. 4A shows localized mapping, and FIG. 4B shows distributed mapping.

Figure 4B:
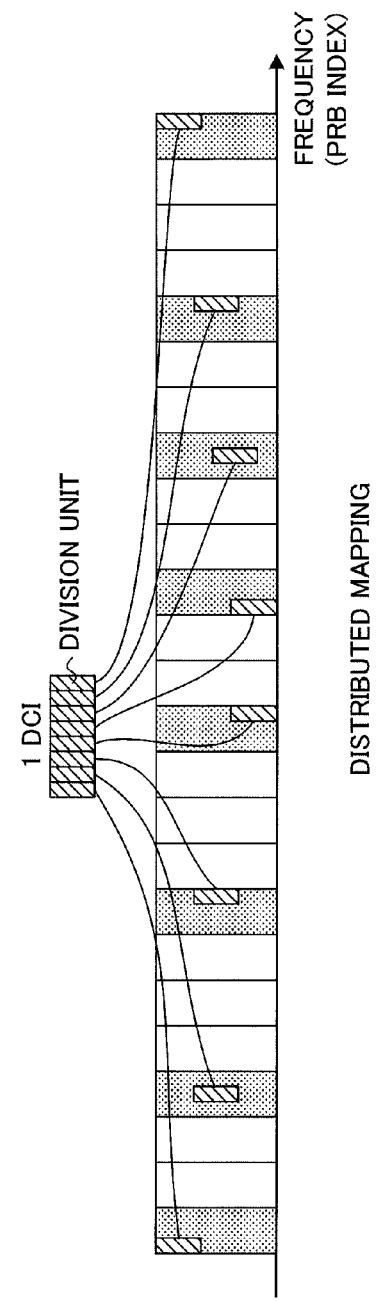

As shown in FIGS. 4A and 4B, enhanced PDCCH resources are comprised of a predetermined number of resource block pairs (hereinafter referred to as "PRB (Physical Resource Block) pairs") that are distributed over the system band. A PRB pair is formed with two PRBs that are consecutive along the time direction, and is identified by a PRB index that is assigned along the frequency direction. A plurality of PRB pairs to constitute enhanced PDCCH resources are determined by a higher layer. The PRB indices to identify each of these plurality of PRB pairs are reported to a user terminal UE through higher layer signaling.

As shown in FIG. 4A, in localized mapping, one piece of DCI is mapped to a specific PRB pair constituting the enhanced PDCCH resources, in a localized manner. To be more specific, one piece of DCI is mapped to one PRB pair (for example, the PRB pair of the best channel quality), based on CQIs fed back from a user terminal UE. Localized mapping can achieve frequency scheduling gain by using CQIs. Note that, in FIG. 4B, among a plurality of PRB pairs constituting the enhanced PDCCH resources, the PDSCH may be mapped to those PRB pairs where no DCI is mapped.

As shown in FIG. 4B, in distributed mapping, one piece of DCI is mapped to a plurality of PRB pairs constituting the enhanced PDCCH resources in a distributed manner. To be more specific, one piece of DCI is divided into a plurality of division units, and each division unit is mapped to the above plurality of PRB pairs (or to all the PRB pairs), in a distributed manner. Distributed mapping can achieve frequency diversity gain by distributing one piece of DCI over the system band.

Figure 5:
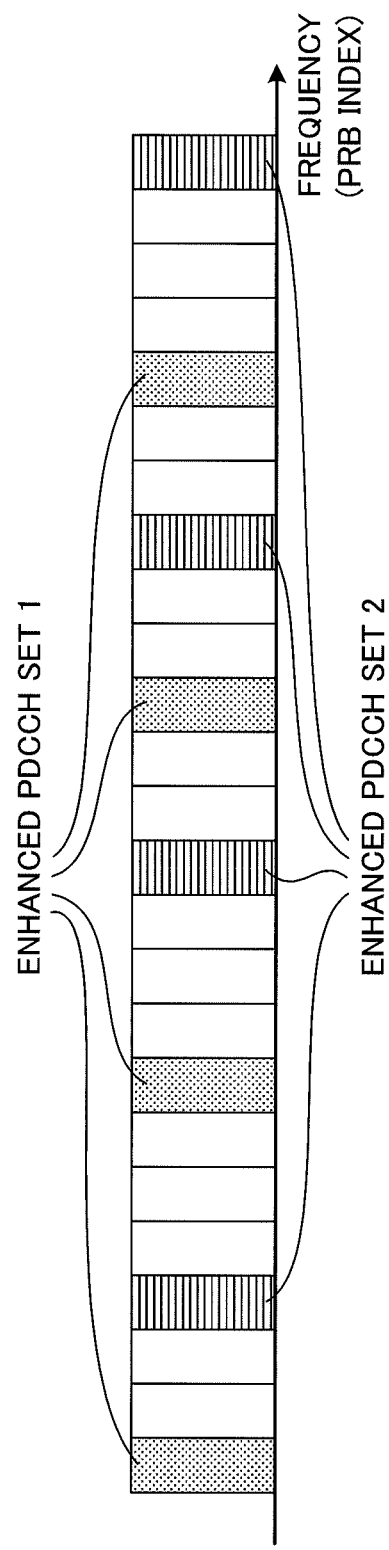
FIG. 5 is a diagram to explain enhanced PDCCH sets.

Also, with enhanced PDCCHs in the FDM approach, a plurality of enhanced PDCCH sets, each including a predetermined number of PRB pairs placed for enhanced PDCCHs, may be provided. FIG. 5 is a diagram to explain enhanced PDCCH sets. As shown in FIG. 5, enhanced PDCCH sets 1 and 2 are each formed to include four different PRB pairs. In this way, when providing two enhanced PDCCH sets, localized mapping (FIG. 4A) may be applied to one enhanced PDCCH set, and distributed mapping (FIG. 4B) may be applied to the other enhanced PDCCH set.

Note that the enhanced PDCCH sets shown in FIG. 5 may be referred to as "ePDCCH sets," "PRB sets," or simply "sets," and so on. Also, the frequency resource units to constitute an enhanced PDCCH set are by no means limited to PRB pairs, and may be resource blocks (PRBs), resource block groups (RBGs) and so on.

Now, when DCI is transmitted using at least one of the legacy PDCCH and an enhanced PDCCH from a radio base station eNB, a user terminal UE needs to blind-decode the search spaces in the enhanced PDCCH, in addition to the search spaces in the legacy PDCCH. FIG. 6 is a diagram to show the number of times of blind decoding when DCI is transmitted using at least one of the legacy PDCCH (PDCCH) and the enhanced PDCCH (ePDCCH). In FIG. 6, the number of times of blind decoding of common search spaces (CSSs) and specific (dedicated) search spaces (USSs: UE-specific Search Spaces, also referred to as "UE-SSs" and so on) are shown with respect to each of the legacy PDCCH and the enhanced PDCCH.

Here, a search space indicates the range in which DCI should be blind-decoded, and may refer to a common search space or a specific search space. A common search space (CSS) indicates the range in which shared control information, which is DCI that is common between user terminal UEs in a cell, should be blind-decoded. Also, a specific search space (USS) indicates the range in which dedicated control information, which is user terminal UE-specific DCI, should be blind-decoded. Note that a CSS for an enhanced PDCCH may be referred to as an eCSS (enhanced Common Search Space) for distinction from a CSS for the legacy PDCCH. Similarly, a USS for an enhanced PDCCH may be referred to as an BUSS (enhanced UE-specific Search Space) for distinction from a USS for the legacy PDCCH.

In both the legacy PDCCH and enhanced PDCCHs, the number of times of blind decoding of common search spaces is determined based on the number of common search space candidates (candidate common search spaces) per aggregation level of the resource allocation units, and the number of DCI formats. Similarly, the number of times of blind decoding of specific search spaces is determined based on the number of specific search space candidates (candidate dedicated search spaces) per aggregation level, and the number of DCI formats.

Here, the resource allocation unit for the legacy PDCCH is referred to as "CCE (Control Channel Element)." A CCE is formed with thirty-six REs (Resource Elements) (that is, nine REGs (Resource Element Groups)). On the other hand, the resource allocation unit for enhanced PDCCHs is referred to as "eCCE (enhanced Control Channel Element)," and so on. An eCCE is formed by dividing resource units such as PRB pairs by various methods such as frequency-division, time-division, code-division and so on. The aggregation level refers to the number of aggregations of CCEs, the number of aggregations of eCCEs and so on.

In FIG. 6, the number of times of blind decoding is twelve for both the common search spaces (CSSs) for the legacy PDCCH and the common search spaces (eCSS) for enhanced PDCCHs. The common search spaces support aggregation levels 4 and 8. For example, in Rel. 10, the number of common search space candidates at aggregation level 4 is four, and the number of common search space candidates at aggregation level 8 is two. Also, for common control information to be transmitted in common search spaces, two DCI formats 1A and 1C may be possible. Consequently, the number of times of blind decoding of common search space becomes (4+2)×2=12.

Also, in FIG. 6, the number of times of blind decoding is forty-eight for both the specific search spaces (USSs) for the legacy PDCCH and the specific search spaces (eUSSs) for enhanced PDCCHs. The specific search spaces support aggregation levels 1, 2, 4 and 8. For example, in Rel. 10, the number of specific search space candidates at aggregation levels 1 and 2 is six, and the number of specific search space candidates at aggregation levels 4 and 8 is two. Also, for specific control information to be transmitted in specific search spaces, three DCI formats 0/1A, 2 and 4 may be possible. Consequently, the number of times of blind decoding of specific search space is (6+6+2+2)×3=48.

Also, FIG. 6 presumes the case where CSSs are provided but no eCSS is provided (case 1), the case where both CSSs and eCSSs are provided (case 2), and the case where no CSS is provided but eCSSs are provided (case 3).

Also, each of cases 1 to 3 further presumes the case where USSs are provided and both localized mapping and distributed mapping are applied to eUSSs (case a), the case where USSs are provided and either localized mapping or distributed mapping is applied to eUSSs (case b), the case where no USS is provided and both localized mapping and distributed mapping are applied to eUSSs (case c), and the case where no USS is provided and either localized mapping or distributed mapping is applied to eUSSs (case d).

By combining cases 1 to 3 and cases a to d, the number of times of blind decoding in a user terminal UE is the largest in case 2a, which means, in the legacy PDCCH, twelve times for the CSSs and forty-eight times for the USSs, and, in enhanced PDCCHs, twelve times for the eCSSs, forty-eight times upon localized mapping of the eUSSs, and forty-eight times upon distributed mapping of the eCSSs, giving a total of 168 times. That is, the number of times of blind decoding in a user terminal UE increases by providing eCSSs in addition to CSSs. Also, the number of times of blind decoding increases by providing eUSSs in addition to USSs. In particular, the number of times of blind decoding increases by applying both localized mapping and distributed mapping to eUSSs. Note that, when the legacy PDCCH alone is used (Rel. 10 and earlier versions), the number of times of blind decoding is twelve times for the CSSs and forty-eight times for the USSs, giving a total of sixty times.

As has been described above, when DCI is transmitted from a radio base station eNB using at least one of the legacy PDCCH and enhanced PDCCHs, the number of times of blind decoding in a user terminal UE increases. In this case, the resource range where DCI can be mapped expands, so that it is possible to reduce the possibility of occurrence of blocking. Meanwhile, the range of executing blind decoding expands, so that the possibility of DCI detection errors in the user terminal UE increases. In this way, the increase in the number of times of blind decoding holds a trade-off relationship between the reduction in the possibility of occurrence of blocking and the increase in the possibility of DCI detection errors, and therefore it is desirable to make the number of times of blind decoding adjustable. So, the present inventors have conceived of making the number of times of blind decoding adjustable by making it possible to configure adequate numbers of search space candidates (candidate search spaces) when DCI is transmitted from a radio base station eNB using at least one of the legacy PDCCH and enhanced PDCCHs, and arrived at the present invention.

Now, the blind decoding method according to the present embodiment will be described. The following description will be based on the radio communication system shown in FIG. 18. Note that a radio base station 10 may refer to both of the radio base stations 11 and 12 of FIG. 18.

In the blind decoding method according to the present embodiment, the radio base station 10 reports information for configuring the number of candidates (candidate quantity configuration information), which is used to configure the numbers of search space candidates with respect to the legacy PDCCH (downlink control channel) and the numbers of search space candidates with respect to an enhanced PDCCH (enhanced downlink control channel), to a user terminal 20. The user terminal 20 blind-decodes DCI (downlink control information) based on the numbers of search space candidates for the legacy PDCCH and the numbers of search space candidates for the enhanced PDCCH, which are configured based on the reported information for configuring the number of candidates (candidate quantity configuration information).

Here, information for configuring the number of candidates (the candidate quantity configuration information) includes, as will be described later, the values of the numbers of search space candidates (the first example), the ratios to total numbers of candidates (the second example), pattern information to show combinations of numbers of search space candidates (the third example), and DCI format information to show DCI formats (the fourth example).

Also, the numbers of search space candidates for the legacy PDCCH and the number of search space candidates for the enhanced PDCCH may both include the number of common search space candidates (hereinafter referred to as "the number of CSS candidates") and the number of specific search space candidates (hereinafter referred to as "the number of USS candidates"). The number of CSS candidates is the number of candidates of a common search space that is shared between user terminals 20 in the cell of the radio base station 10. Also, the number of USS candidates is the number of candidates of a specific search space that is user terminal 20-specific.

Also, enhanced PDCCH sets 1 and 2 (the first and second frequency resource sets), each including and formed with a plurality of PRB pairs (frequency resource units) provided for enhanced PDCCHs, may be provided. In this case, the number of CSS candidates for enhanced PDCCHs may refer to the number of CSS candidates for enhanced PDCCH set 1. Also, the number of USS candidates for enhanced PDCCHs may refer to the number of USS candidates for enhanced PDCCH set 1 and the number of USS candidates for enhanced PDCCH set 2.

FIRST EXAMPLE

The blind decoding method according to a first example of the present embodiment will be described with reference to FIGS. 7 and 8. With the blind decoding method according to the first example, the number of CSS candidates for the legacy PDCCH, the number of USS candidates for the legacy PDCCH, and the number of USS candidates for enhanced PDCCH set 1 are reported from the radio base station 10 to a user terminal 20 as information for configuring the number of candidates (candidate quantity configuration information).

FIG. 7A and FIG. 7B are diagrams to explain examples of the blind decoding method according to the first example. FIG. 7A shows an example configuration of the number of CSS candidates and the number of USS candidates for the legacy PDCCH (PDCCH), the number of CSS candidates and the number of USS candidates for enhanced PDCCH set 1 of enhanced PDCCHs (ePDCCHs), and the number of USS candidates for enhanced PDCCH set 2 of enhanced PDCCHs (ePDCCHs). FIG. 7B shows the content of the information for configuring the number of candidates that is reported from the radio base station 10.

In FIG. 7A and FIG. 7B, the number of CSS candidates a for the legacy PDCCH at AL 4 and the number of CSS candidates b at AL 8, the number of USS candidates c for the legacy PDCCH at AL 1 and AL 2 and the number of USS candidates d at AL 4 and AL 8, and the number of USS candidates e for enhanced PDCCH set 1 at AL 1 and AL 2 and the number of USS candidates f at AL 4 and AL 8 are reported from the radio base station 10 to the user terminal 20 as information for configuring the number of candidates. Note that, in Rel. 10 and earlier versions, the number of USS candidates is "6" and the same at AL 1 and at AL 2, and the number of USS candidates is "2" and the same at AL 4 and at AL 8. Consequently, also in FIG. 7A, it is possible to reduce the amount of signaling by using the same variables c and e at AL 1 and at AL 2 and by using the same variables d and f at AL 4 and at AL 8.

As shown in FIG. 7B, the number of CSS candidates a is configured to be equal to or lower than the total number of CSS candidates at AL 4 (here, "4," which is equal to that of Rel. 10 and earlier versions). Similarly, the number of CSS candidates b is configured to be equal to or lower than the total number of CSS candidates at AL 8 (here, "2," which is equal to that of Rel. 10 and earlier versions). Also, the number of USS candidates c is configured to be equal to or lower than the total number of CSS candidates at AL 1 and at AL 2 (here, "6," which is equal to that of Rel. 10 and earlier versions). The number of USS candidates d is configured to be equal to or lower than the total number of CSS candidates at AL 4 and at AL 8 (here, "2," which is equal to that of Rel. 10 and earlier versions). The numbers of USS candidates e and f are configured likewise. As these numbers of CSS candidates a and b and the numbers of USS candidates "c," "d, "e, "and "f," values that are reported from the radio base station 10 are configured on an as-is basis, as shown in FIG. 7A.

On the other hand, as shown in FIG. 7A, the number of CSS candidates for the enhanced PDCCHs at AL 4 is configured by subtracting the number of CSS candidates a for the legacy PDCCH from the total number of CSS candidates at AL 4 (here, "4," which is equal to that of Rel. 10 and earlier versions). Similarly, the number of CSS candidates for the enhanced PDCCH at AL 8 is configured by subtracting the number of CSS candidates b for the legacy PDCCH from the total number of CSS candidates at AL 4 (here, "2," which is equal to that of Rel. 10 and earlier versions).

Also, the number of CSS candidates for enhanced PDCCH set 2 at AL 1 and AL 2 is configured by subtracting the number of USS candidates c for the legacy PDCCH and the number of USS candidates e for enhanced PDCCH set 1 from the total number of USS candidates at AL 1 and AL 2 (here, "6," which is equal to that of Rel. 10 and earlier versions). Similarly, the number of CSS candidates for enhanced PDCCH set 2 at AL 4 and AL 8 is configured by subtracting the number of USS candidates d for the legacy PDCCH and the number of USS candidates f for enhanced PDCCH set 1 from the total number of USS candidates at AL 4 and AL 8 (here, "2," which is equal to that of Rel. 10 and earlier versions).

With this configuration, the total number of candidates of the number of CSS candidates for the legacy PDCCH and the number of CSS candidates for enhanced PDCCHs becomes equal to the number of CSS candidates in Rel. 10 and earlier versions (here, "4" at AL 4 and "2" at AL 8). Similarly, the total number of candidates of the number of USS candidates for the legacy PDCCH and the numbers of USS candidates for enhanced PDCCH sets 1 and 2 becomes equal to the number of USS candidates in Rel. 10 and earlier versions (here, "6" at AL 1 and AL 2, and "2" at AL 4 and AL 8). Consequently, the number of times of blind decoding in the user terminal 20 becomes equal to that in Rel. 10 and earlier versions, so that it is possible to prevent the increase of the possibility of DCI detection errors due to an increased number of times of blind decoding.

Note that, as shown in FIG. 7B, the radio base station 10 may configure the values of the numbers of CSS candidates a and b based on whether or not to provide CSSs (eCSSs) in enhanced PDCCHs. Also, the radio base station 10 may configure the values of the numbers of USS candidates c and d based on whether the user terminal 20 monitors both the legacy PDCCH and the enhanced PDCCHs or monitors the enhanced PDCCHs alone. Also, the radio base station 10 may configure the values of the numbers of USS candidates "e "and "f "based on whether the user terminal 20 monitors both enhanced PDCCH sets 1 and 2 or monitors only one of these. Also, the radio base station 10 may configure the values of the numbers of CSS candidates a and b and the numbers of USS candidates c to f, based on feedback information (channel state information (CSI) such as channel quality indicators (CQIs) and rank indicators (RIs), received quality, propagation loss and so on) from the user terminal 20.

As has been described above, with the blind decoding method according to the first example, the numbers of CSS candidates a and b for the legacy PDCCH, the numbers of USS candidates c and d for the legacy PDCCH, and the numbers of USS candidates e and f for enhanced PDCCH set 1 are reported from the radio base station 10 to the user terminal 20 as information for configuring the number of candidates. Consequently, the user terminal 20 has only to calculate the number of CSS candidates for enhanced PDCCH set 1 and the number of USS candidates for enhanced PDCCH set 2. As a result of this, it is possible to reduce the load of computation accompanying the configuration of the number of CSS candidates and the number of USS candidates in the user terminal 20.

FIG. 8A and FIG. 8B are diagrams to explain another example of the blind decoding method according to the first example. Differences from FIGS. 7A and 7B will be primarily described below. FIGS. 8A and 8B are different from FIGS. 7A and 7B in that the number of USS candidates is reported as information for configuring the number of candidates using different variables per aggregation level (AL).

To be more specific, in FIG. 8A and FIG. 8B, the number of CSS candidates a for the legacy PDCCH at AL 4 and the number of CSS candidates b at AL 8, the number of USS candidates c for the legacy PDCCH at AL 1, the number of USS candidates d at AL 2, the number of USS candidates e at AL 4 and the number of USS candidates f at AL 8, and the number of USS candidates g for enhanced PDCCH set 1 at AL 1, the number of USS candidates h at AL 2, the number of USS candidates i at AL 4 and the number of USS candidates j at AL 8 are reported from the radio base station 10 to the user terminal 20 as information for configuring the number of candidates. In this way, by reporting the number of USS candidates on a per aggregation level (AL) basis, it becomes possible to configure the number of USS candidates more flexibly, on a per AL basis.

Note that FIGS. 7A and 7B and FIGS. 8A and 8B only show examples of the blind decoding method according to the first example, and the configuration of the number of CSS candidates and the number of USS candidates, and the information for configuring the number of candidates are by no means limiting. For example, although, in FIG. 7A and FIG. 8A, USSs are provided in both enhanced PDCCH sets 1 and 2, USSs may be provided in only one of enhanced PDCCH sets 1 and 2. Also, it is equally possible not to provide enhanced PDCCH sets 1 and 2. In this case, the numbers of USS candidates e and f, and g to i for enhanced PDCCH set 1, shown in FIG. 7B and FIG. 8B, need not be reported to the user terminal 20.

Also, the aggregation levels (ALs) are not limited to the ones shown in FIG. 7A and FIG. 8A. Also, even when the total number of candidates per aggregation level (AL) (for example, "4" at AL 4 and "2" at AL 8 for CSSs, "6" at AL 1 and at AL 2 for USSs, and "2" at AL 4 and at AL 8 for USSs) is changed, it is possible to change and apply the blind decoding method according to the first example as appropriate. Also, when the number of aggregation levels (ALs) (for example, two for CSSs and four for USSs), or when the types of ALs are changed (for example, when using AL 3, AL 16 and so on, instead of AL 1, AL 2, AL 4 and AL 8), it is still possible to change and apply the blind decoding method according to the third example as appropriate.

SECOND EXAMPLE

The blind decoding method according to a second example of the present embodiment will be described with reference to FIGS. 9 and 10. With the blind decoding method according to the second example, the ratio of the number of CSS candidates for the legacy PDCCH to the total number of CSS candidates, the ratio of the number of USS candidates for the legacy PDCCH to the total number of USS candidates, and the ratio of the number of USS candidates for enhanced PDCCH set 1 to the number of USS candidates for enhanced PDCCHs are reported from the radio base station 10 to the user terminal 20 as information for configuring the number of candidates (candidate quantity configuration information).

FIG. 9A and FIG. 9B are diagrams to explain an example of the blind decoding method according to the second example. FIG. 9A shows an example configuration of the number of CSS candidates and the number of USS candidates, and FIG. 9B shows the content of information for configuring the number of candidates reported from the radio base station 10. Note that, in FIG. 9A, values calculated by the equations shown on the right side are substituted in the variables a to f shown in the table. Also, in the equations shown on the right side, the values c and f that are used to calculate the values e and f are substituted with the calculated values of c and f.

In FIG. 9A and FIG. 9B, the ratio m of the number of CSS candidates for the legacy PDCCH to the total number of CSS candidates (the first ratio), the ratio n of the number of USS candidates for the legacy PDCCH to the total number of USS candidates (the second ratio), and the ratio n' of the number of USS candidates for enhanced PDCCH set 1 to the number of USS candidates for enhanced PDCCHs (the third ratio) are reported from the radio base station 10 to the user terminal 20 as information for configuring the number of candidates.

As shown in FIG. 9A, the number of CSS candidates for the legacy PDCCH and the number of CSS candidates for enhanced PDCCHs are calculated based on the result of multiplying total numbers of CSS candidates (here, "4" at AL 4 and "2" at AL 8) by the ratio m reported from the radio base station 10. To be more specific, the numbers of CSS candidates a and b for the legacy PDCCH at each AL are configured by making the results of the multiplication of the total numbers of CSS candidates by the ratio m ("4*m" at AL 4 and "2*m" at AL 8) integers by using a floor function. Also, the numbers of CSS candidates for enhanced PDCCHs at each AL are configured by subtracting the calculated numbers of CSS candidates for the legacy PDCCH from total numbers of CSS candidates ("4" at AL 4 and "2" at AL 8).

Also, the number of USS candidates for the legacy PDCCH and the number of USS candidates for enhanced PDCCHs are calculated based on the results of multiplying total numbers of USS candidates (here, "6" at AL 1 and AL 2, and "2" at AL 4 and AL 8) by the ratio n reported from the radio base station 10. To be more specific, the numbers of USS candidates c and d for the legacy PDCCH at each AL are configured by making the results of the multiplication of the total numbers of USS candidates by the ratio n ("6*n" at AL 1 and AL 2, and "2*n" at AL 4 and AL 8) integers by using a floor function. Also, the numbers of USS candidates for enhanced PDCCHs at each AL are configured by subtracting the calculated numbers of USS candidates for the legacy PDCCH from total numbers of USS candidates ("6" at AL 1 and AL 2, and "2" at AL 4 and AL 8).

The numbers of USS candidates for enhanced PDCCH sets 1 and 2 are calculated based on the results of multiplying the numbers of USS candidates for enhanced PDCCHs calculated based on the ratio n, further by the ratio n'. To be more specific, the numbers of USS candidates e and f for the enhanced PDCCH set 1 at each AL are configured by making the results of the multiplication of the numbers of USS candidates 6-c and 2-d for enhanced PDCCHs by the ratio n' ("6*n" at AL 1 and AL 2, and "2*n" at AL 4 and AL 8) integers by using a floor function. Also, the numbers of USS candidates for enhanced PDCCH set 2 at each AL are configured by subtracting the numbers of USS candidates c and d for the legacy PDCCH and the numbers of USS candidates e and f for enhanced PDCCH set 1, from total numbers of CSS candidates ("6" at AL 1 and AL 2, and "2" at AL 4 and AL 8).

In this way, according to the configuration using the ratios m, n and n' to total number of candidates, the total number of candidates of the number of CSS candidates for the legacy PDCCH and the numbers of CSS candidates for enhanced PDCCHs becomes equal to the number of candidates in Rel. 10 and earlier versions (here, "4" at AL 4 and "2" at AL 8). Similarly, the total number of candidates of the number of USS candidates for the legacy PDCCH and the numbers of USS candidates for enhanced PDCCH sets 1 and 2 becomes equal to the number of candidates in Rel. 10 and earlier versions (here, "6" at AL 1 and AL 2, and "2" at AL 4 and AL 8). Consequently, the number of times of blind decoding in the user terminal 20 becomes equal to that in Rel. 10 and earlier versions, so that it is possible to prevent the increase of the possibility of DCI detection errors due to an increased number of times of blind decoding.

Note that, as shown in FIG. 9B, the radio base station 10 may configure the ratio m based on whether or not to provide CSSs (eCSSs) in enhanced PDCCHs. Also, the radio base station 10 may configure the ratio n based on whether the user terminal 20 monitors both the legacy PDCCH and enhanced PDCCHs or monitors enhanced PDCCHs alone. Also, the radio base station 10 may configure the ratio n' based on whether the user terminal 20 monitors both enhanced PDCCH sets 1 and 2 or monitors only one of these. Also, the radio base station 10 may configure the values of the ratios m, n and n' based on feedback information (channel state information (CSI) such as channel quality indicators (CQIs), rank indicators (RIs), received quality, propagation loss and so on) from the user terminal 20.

As has been described above, with the blind decoding method according to the second example, the ratio m of the number of CSS candidates for the legacy PDCCH to the total number of CSS candidates, the ratio n of the number of USS candidates for enhanced PDCCHs to the total number of USS candidates, and the ratio n' of the number of USS candidates for enhanced PDCCH set 1 to the number of USS candidates for enhanced PDCCHs are reported from the radio base station 10 to the user terminal 20 as information for configuring the number of candidates. Consequently, it is not necessary to signal many numbers of CSS candidates or USS candidates as in the case with the first example, so that it is possible to reduce the amount of signaling accompanying the configuration of the number of CSS candidates and the number of USS candidates in the user terminal 20.

Note that FIGS. 9A and 9B show examples of the blind decoding method according to the second example, and the configuration of the number of CSS candidates and the number of USS candidates, and the information for configuring the number of candidates are by no means limiting. For example, although, in FIG. 7A and FIG. 8A, USSs are provided in each of enhanced PDCCH sets 1 and 2, it is equally possible to provide USSs only in one of enhanced PDCCH sets 1 and 2. Also, it is equally possible not to provide enhanced PDCCH sets 1 and 2. In this case, the ratio n' in FIG. 9B may be omitted.

Also, in FIGS. 9A and 9B, the ratios m, n and n' are used at all ALs in common. However, these ratios may be provided on a per AL basis as well. Also, these ratios may be provided for every different total number of candidates (for example, a ratio n1 for USSs at AL 1 and AL 2, a ratio n2 at AL 4 and AL 8, and so on). Also, the aggregation levels (ALs) are not limited to the ones shown in FIG. 9A. Also, even when the total number of candidates is changed per aggregation level (AL), it is still possible to change and apply the blind decoding method according to the second example as appropriate.

FIG. 10 is a diagram to show an example of the number of times of blind decoding with the blind decoding method according to the second example. In FIG. 10, the number of times of blind decoding when the number of CSS candidates and the number of USS candidates are configured based on the ratios m, n and n' is shown with respect to cases 1a to 3d, which are the same as in FIG. 6. As shown in FIG. 10, when the blind decoding method is applied to an example according to the second example (W proposed method), the number of times of blind decoding is sixty in any of cases 1a to 3d. That is, even when DCI is transmitted using at least one of the legacy PDCCH and enhanced PDCCHs, the number of times of blind decoding becomes the same as in Rel. 10 and earlier versions. As a result of this, it is possible to prevent the increase of the possibility of DCI detection errors due to an increased number of times of blind decoding.

THIRD EXAMPLE

The blind decoding method according to a third example of the present embodiment will be described with reference to FIGS. 11 to 16. With the blind decoding method according to the third example, pattern information to represent combinations of numbers of CSS candidates and numbers of USS candidates for the legacy PDCCH, and numbers of CSS candidates and numbers of USS candidates for enhanced PDCCH sets 1 and 2, is reported from the radio base station 10 to the user terminal 20 as information for configuring the number of candidates.

FIGS. 11 to 16 are diagrams, each showing an example of the blind decoding method according to the third example. FIGS. 11 to 16 show examples of combinations of numbers of CSS candidates and numbers of USS candidates for each of the legacy PDCCH (PDCCH) and enhanced PDCCHs (ePDCCHs). In FIGS. 11 to 16, pattern information to represent combinations of the number of CSS candidates and the number of USS candidates for the legacy PDCCH at each AL and the numbers of CSS candidates and the numbers of USS candidates for enhanced PDCCH sets 1 and 2 at each AL, is reported from the radio base station 10 to the user terminal 20 as information for configuring the number of candidates.

In FIG. 11 to FIG. 16, the pattern information and the combinations represented by the pattern information are associated with each other, and stored in both the radio base station 10 and the user terminal 20 in advance. The radio base station 10 selects, for example, combinations that correspond to various cases (the state of the user terminal 20 and so on) from the combinations shown in FIGS. 11 to 16, and reports the pattern information associated with the selected combinations. The user terminal 20 configures the above numbers of CSS candidates and the numbers of USS candidates in accordance with the combinations associated with the pattern information reported. By this means, it is possible to reduce both the amount of signaling and the amount of computation in the user terminal 20 accompanying the configuration of the number of CSS candidates and the number of USS candidates.

FIG. 11 shows examples of combinations of numbers of CSS candidates and numbers of USS candidates when multi-user MIMO is applied. When multi-user MIMO is applied, it is preferable to transmit common control information that is common between user terminals 20 by means of the legacy PDCCH, and transmit specific control information that is user terminal 20-specific by means of the enhanced PDCCH. Consequently, combinations of numbers of CSS candidates and numbers of USS candidates are determined in advance so that CSSs alone are provided in the legacy PDCCH and USSs alone are provided in enhanced PDCCHs.

In the combinations shown in FIG. 11, the number of CSS candidates for the legacy PDCCH is "4" or "2," and the number of USS candidates for enhanced PDCCH set 1 is "6" or "2." Meanwhile, the number of CSS candidates for enhanced PDCCH set 2 and the number of USS candidates for the legacy PDCCH are "0." The combinations shown in FIG. 11 are associated with pattern information (here, pattern 1). When adopting multi-user MIMO to communicate with the user terminal 20, the radio base station 10 reports the pattern information to show the combinations shown in FIG. 11 (here, pattern 1), to the user terminal 20. Also, the combinations shown in FIG. 11 are not limited to the use in the case of multi-user MIMO.

FIG. 12 shows examples of combinations of numbers of CSS candidates and numbers of USS candidates when the legacy PDCCH cannot be used. Cases where the legacy PDCCH cannot be used may include, for example, the case where communication is conducted using a carrier in which the legacy PDCCH cannot be provided (which may be referred to as a new type carrier, an additional carrier or a capacity carrier). In this case, both common control information and specific control information need to be transmitted in the enhanced PDCCH. Consequently, combinations of numbers of CSS candidates and numbers of USS candidates are determined in advance so that both CSSs and USSs are provided in the enhanced PDCCH.

In the combinations shown in FIG. 12, the numbers of CSS candidates and the numbers of USS candidates for the legacy PDCCH are all "0." Meanwhile, the number of CSS candidates is "4" or "2" and the number of USS candidates is "6" or "2" for enhanced PDCCH set 1, and the numbers of CSS candidates and the numbers of USS candidates for enhanced PDCCH set 2 are all "0." The combinations shown in FIG. 12 are associated with pattern information (here, pattern 2). When the legacy PDCCH cannot be used, the radio base station 10 reports pattern information to represent the combinations shown in FIG. 12 (here, pattern 2) to the user terminal 20. Note that, in FIG. 12, instead of enhanced PDCCH set 1, it is equally possible to configure the number of CSS candidates for enhanced PDCCH set 2 to "4" or "2," and the number of USS candidates to "6" or "2." Also, the combinations shown in FIG. 12 are not limited to the use in the case of a carrier in which the legacy PDCCH cannot be provided.

FIG. 13 shows examples of combinations of numbers of CSS candidates and numbers of USS candidates when the legacy PDCCH cannot be used (for example, when a carrier in which the legacy PDCCH cannot be used is used, and so on) and beam-forming is carried out using feedback information (for example, CSI and PMI) from the user terminal 20. In this case, DCI is subject to distributed mapping in one enhanced PDCCH set 1, and DCI is subject to localized mapping in the other enhanced PDCCH set 2.

Here, common control information is suitable for distributed mapping that can achieve frequency diversity gain, and specific control information is suitable for localized mapping that can achieve beam-forming gain by means of transmission beams pointed to the user terminal 20. Consequently, in FIG. 13, combinations of numbers of CSS candidates and numbers of USS candidates are determined in advance so that CSSs are provided in enhanced PDCCH set 1, which is subject to distributed mapping, and USSs are provided in enhanced PDCCH set 2, which is subject to localized mapping.

In the combinations shown in FIG. 13, the numbers of CSS candidates and the numbers of USS candidates for the legacy PDCCH are all "0." Meanwhile, the number of CSS candidates for enhanced PDCCH set 1 subject to distributed mapping is "4" or "2," and the number of USS candidates for enhanced PDCCH set 2 subject to localized mapping is "6" or "2." Also, the number of USS candidates for enhanced PDCCH set 1 subject to distributed mapping and the number of CSS candidates for enhanced PDCCH set 2 subject to localized mapping are "0."

The combinations shown in FIG. 13 are associated with pattern information (here, pattern 3). When the legacy PDCCH cannot be used and beam-forming is conducted using feedback information (for example, CSI and PMI) from the user terminal 20, the radio base station 10 reports pattern information to represent the combinations shown in FIG. 13 (here, pattern 3) to the user terminal 20.

FIG. 14 shows examples of combinations of numbers of CSS candidates and numbers of USS candidates for using the PDSCH and enhanced PDCCHs efficiently. To use the PDSCH and enhanced PDCCHs efficiently, when the number of user terminals 20 is equal to or lower than a predetermined threshold value, it is preferable to map DCI to one enhanced PDCCH set 1. This is because the PDSCH and enhanced PDCCHs are frequency-division-multiplexed so that the other enhanced PDCCH set 2 becomes available for the use for the PDSCH. On the other hand, when the number of user terminals 20 is greater than a predetermined threshold value, it is preferable to map DCI to both enhanced PDCCH sets 1 and 2.

In this way, when using the PDSCH and enhanced PDCCHs efficiently, DCI for a specific user terminal 20 is mapped to either enhanced PDCCH set 1 or 2, depending on the number of user terminals 20. Here, the user terminal 20 is unable to know to which of enhanced PDCCH sets 1 and 2 the DCI for that user terminal 20 is mapped. Consequently, in FIG. 14, numbers of USS candidates are distributed over both enhanced PDCCH sets 1 and 2, so that the user terminal 20 is able to blind-decode both enhanced PDCCH sets 1 and 2.

In the combinations shown in FIG. 14 (pattern 4-1), equal numbers of USS candidates are set with respect to enhanced PDCCH sets 1 and 2. For example, with these combinations, the number of USS candidates for enhanced PDCCH sets 1 and 2 is equally "3" or "1." Note that the number of CSS candidates for the legacy PDCCH is "4" or "2," the numbers of USS candidates for the legacy PDCCH are "0," and the numbers of CSS candidates for enhanced PDCCH sets 1 and 2 are "0." These combinations are associated with pattern information (here, pattern 4-1).

Also, in the combinations shown in FIG. 14 (pattern 4-2), the number of USS candidates for one enhanced PDCCH set is determined to be equal to or greater than the number of USS candidates for the other enhanced PDCCH set. For example, with these combinations, the number of USS candidates for enhanced PDCCH set 1 is "4" or "1," while the number of USS candidates for enhanced PDCCH set 2 is "2" or "1." Note that the number of CSS candidates for the legacy PDCCH is "4" or "2," the number of USS candidates for the legacy PDCCH is "0," and the numbers of CSS candidates for enhanced PDCCH sets 1 and 2 are "0." These combinations are associated with pattern information (here, pattern 4-2).

In the situation where the PDSCH and enhanced PDCCHs should be used in an efficient manner, the radio base station 10 reports pattern information to represent the combinations of FIG. 14 (here, pattern 4-1 or 4-2) to the user terminal 20. The combinations of pattern 4-1 are selected by the radio base station 10 when, for example, enhanced PDCCH sets 1 and 2 are both allocated to a plurality of user terminals 20 evenly. On the other hand, the combinations of pattern 4-2 are effective when enhanced PDCCH set 1 is used as a primary set that is common between user terminals 20, and enhanced PDCCH set 2 is used as a secondary set that is user terminal 20-specific.

Note that, in FIG. 14, CSSs may be provided in the enhanced PDCCHs, not in the legacy PDCCH. Also, although, in FIG. 14, USSs are provided in the enhanced PDCCHs alone, it is equally possible to provide USSs in the legacy PDCCH as well.

FIG. 15 shows examples of combinations of numbers of CSS candidates and numbers of USS candidates when a user terminal 20 has high capabilities. With the combinations shown in FIG. 11 to FIG. 14, the increase of the possibility of DCI detection errors is prevented by determining the numbers of CSS candidates and the numbers of USS candidates so that the number of times of blind decoding in the user terminal 20 becomes equal as in Rel. 10 and earlier versions. Meanwhile, when the user terminal 20 has high capabilities, it is preferable to reduce the possibility of occurrence of blocking by increasing the number of times of blind decoding. Consequently, in FIG. 15, combinations of numbers of CSS candidates and numbers of USS candidates are determined in advance so that the numbers of USS candidates for enhanced PDCCH sets 1 and 2 increase.

In the combinations shown in FIG. 15 (pattern 4'-1), the number of USS candidates for enhanced PDCCH set 1 is increased. For example, with these combinations, the number of USS candidates for enhanced PDCCH set 1 is "6" or "2," which is twice as many as in the combinations shown in FIG. 14 (pattern 4-1). On the other hand, the number of USS candidates for enhanced PDCCH set 2 is "3" or "1," which is the same as in the combinations shown in FIG. 14 (pattern 4-1). Note that the number of CSS candidates for the legacy PDCCH is "4" or "2," the number of USS candidates for the legacy PDCCH is "0," and the numbers of CSS candidates for enhanced PDCCH sets 1 and 2 are "0." These combinations are associated with pattern information (here, pattern 4'-1).

Also, in the combinations shown in FIG. 15 (pattern 4'-2), the number of USS candidates is increased for both enhanced PDCCH sets 1 and 2. For example, with these combinations, with respect to both of enhanced PDCCH sets 1 and 2, the number of USS candidates is "6" or "2," which is twice as many as in the combinations shown in FIG. 14 (pattern 4-1). Note that the number of CSS candidates for the legacy PDCCH is "4" or "2," the number of USS candidates for the legacy PDCCH is "0," and the numbers of CSS candidates for enhanced PDCCH sets 1 and 2 are "0." These combinations are associated with pattern information (here, pattern 4'-2).

The radio base station 10 determines whether or not a user terminal 20 has high capabilities based on capability information (for example, UE-Capability) reported from the user terminal 20. When the user terminal 20 has high capabilities, the radio base station 10 reports pattern information to represent the combinations of FIG. 15 (here, pattern 4'-1 or 4'-2), to the user terminal 20. Note that the selection between pattern 4'-1 and 4'-2 may be made based on the capability information of the user terminal 20, or may be made based on the way enhanced PDCCH sets 1 and 2 are allocated (regarding, for example, the primary set, secondary sets, uniform allocation and so on) to the user terminal 20.

Note that, in FIG. 15, CSSs may be provided in the enhanced PDCCHs, not in the legacy PDCCH. Also, although, in FIG. 15, USSs are provided in the enhanced PDCCHs alone, it is equally possible to provide USSs in the legacy PDCCH as well.

FIG. 16 shows examples of combinations of numbers of CSS candidates and numbers of USS candidates when the signal quality with a user terminal 20 is good. When the signal quality with the user terminal 20 is better than a predetermined threshold value, DCI is transmitted at low ALs, such as aggregation levels (AL) 1 or 2, for example. Consequently, in FIG. 16, combinations of numbers of CSS candidates and numbers of USS candidates are determined in advance so that the relatively low ALs have an increased number of USS candidates.

With the combinations shown in FIG. 16, the number of USS candidates for enhanced PDCCH set 1 at AL 1 and AL 2 is "8," while the number of USS candidates at AL 4 and AL 8 is "0." Note that the number of CSS candidates for the legacy PDCCH is "4" or "2," the number of USS candidates for the legacy PDCCH is "0," and the numbers of CSS candidates for enhanced PDCCH sets 1 and 2 are "0." These combinations are associated with pattern information (here, pattern 5).

The radio base station 10 determines whether or not the signal quality is equal to or higher than a predetermined threshold value based on signal quality information (SNR, SINR, CQI, propagation loss and so on) reported from the user terminal 20. When the signal quality of the user terminal 20 is equal to or higher than the predetermined threshold value, the radio base station 10 reports pattern information to represent the combinations of FIG. 16 (here, pattern 5) to the user terminal 20.

Note that, in FIG. 16, it is equally possible to increase the number of USS candidates for enhanced PDCCH set 2 at AL 1 and AL 2, not enhanced PDCCH set 1. Also, in FIG. 16, the number of USS candidates is increased at AL 1 and AL 2, but it is equally possible to increase the number of USS candidates only at AL 1. Also, in FIG. 16, for example, the number of CSS candidates may be configured to "6" and "0" at AL 4 and AL 8, respectively, and the number of CSS candidates may be increased at the lower ALs.

As has been described above, with the blind decoding method according to the third example, the pattern information shown in FIGS. 11 to 16 is reported from the radio base station 10 to the user terminals 20 as information for configuring the number of candidates, and the user terminal 20 configures the number of CSS candidates and the number of USS candidates in combinations that are stored in advance in association with pattern information. Consequently, it is possible to reduce the amount of signaling accompanying the configuration of the number of CSS candidates and the number of USSs, and also reduce the amount of computation in the user terminal 20 accompanying this configuration.

Note that the pattern information and the combinations associated with the pattern information shown in FIGS. 11 to 16 are simply examples and are by no means limiting. For example, although FIGS. 11 to 16 show combinations of numbers of CSS candidates and numbers of USS candidates for enhanced PDCCHs and enhanced PDCCH sets 1 and 2, if enhanced PDCCH sets are not provided, there is no need to distinguish between enhanced PDCCH sets 1 and 2.

Also, the aggregation levels (ALs) are not limited to the ones shown in FIGS. 11 to 16. Also, when the total number of candidates (for example, "4" at AL 4 and "2" at AL 8 for CSSs, "6" at AL 1 and at AL 2 for USSs, and "2" at AL 4 and at AL 8 for USSs), is changed per aggregation level (AL), it is still possible to change and apply the blind decoding method according to the third example as appropriate. Also, when the number of aggregation levels (ALs) (for example, 2 for CSSs and 4 for USSs) is changed, or when the types of ALs are changed (for example, when using AL 3 or AL 16 instead of AL 1, AL 2, AL 4 and AL 8) and so on, it is equally possible to change and apply the blind decoding method according to the third example as appropriate.

FOURTH EXAMPLE

The blind decoding method according to a fourth example of the present embodiment will be described with reference to FIG. 17. With the blind decoding method according to the fourth example, format information to represent the DCI formats of DCI that is transmitted using USSs for the legacy PDCCH and USSs for enhanced PDCCH sets 1 and 2 is reported from the radio base station 10 to the user terminal 20 as information for configuring the number of candidates.

FIG. 17 is a diagram to explain an example of the blind decoding method according to the fourth example. FIG. 17 shows an example configuration of format information and the number of USS candidates in each of the legacy PDCCH (PDCCH) and enhanced PDCCH sets (sets) 1 and 2 of enhanced PDCCHs (ePDCCHs).

In FIG. 17, format information to represent a DCI format X for DCI that is transmitted in USSs in the legacy PDCCH, and DCI formats Z and Y for DCI that is transmitted in USSs in enhanced PDCCH sets 1 and 2, is reported from the radio base station 10 to the user terminal 20 as information for configuring the number of candidates. The user terminal 20 blind-decodes the DCI formats designated in the reported format information.

For the DCI formats X, Y and Z, a format 0/1A, which shows one of a format 0, which includes PUSCH scheduling information (UL grants), and a format 1A, which includes common control information, format 2 series, which includes PDSCH scheduling information (DL grants), and a format 4, which includes uplink MIMO scheduling information, and so on are designated.

Usually, the user terminal 20 is unable to know the DCI format that is transmitted in USSs in advance, and therefore blind-decodes USSs with respect to every possible DCI format. For example, the number of times of blind decoding of USSs for the legacy PDCCH in Rel. 10 becomes the value that is given by multiplying the number of USS candidates at each AL (6+6+2+2) by a plurality of DCI formats (that is, by two DCI formats 0/1A and 2, or by three DCI formats 0/1A, 2 and 4) (that is, 16×2=32 or 16×3=48).

On the other hand, in FIG. 17, format information to represent the DCI formats X, Y and Z is reported from the radio base station 10 to the user terminal 20. Consequently, the user terminal 20 has only to blind-decode the USSs for each of the legacy PDCCH and enhanced PDCCH sets 1 and 2, according to one DCI format designated by the format information, and does not have to decode a plurality of DCI formats.

Consequently, as shown in FIG. 17, even when the number of USS candidates for the legacy PDCCH and the number of USS candidates for enhanced PDCCH sets 1 and 2 are each configured to be the same as the total number of USS candidates in Rel. 10 and earlier versions (that is, "6" at AL 1 and AL 2 and "2" at AL 4 and AL 8), it is still possible to make the number of times of blind decoding the same on the whole (that is, forty-eight times).

As has been described above, with the blind decoding method according to the fourth example, format information of DCI that is transmitted in USSs in the legacy PDCCH and in USSs in enhanced PDCCH sets 1 and 2 is reported from the radio base station 10 to the user terminal 20 as information for configuring the number of candidates. Also, the user terminal 20 blind-decodes the USSs for the legacy PDCCH and the USSs for enhanced PDCCH sets 1 and 2 based on the DCI formats designated in the format information that is reported. Consequently, even when DCI is transmitted using at least one of the legacy PDCCH and enhanced PDCCHs, it is still possible to prevent the increase of the number of times of blind coding, and prevent the increase of the possibility of DCI detection errors. Furthermore, by designating DCI formats, it is possible to increase the number of USS candidates for the legacy PDCCH and the number of USS candidates for enhanced PDCCH sets 1 and 2 respectively, so that it is also possible to prevent the increase of the possibility of occurrence of blocking.

Note that, in FIG. 17, the number of USS candidates for the legacy PDCCH and the number of USS candidates for enhanced PDCCH sets 1 and 2 are configured in accordance with the decrease of the number of formats to be blind-decoded, based on format information. Combinations of these numbers of USS candidates may be stored in the user terminal 20 in advance. Alternatively, combinations of these numbers of USS candidates may be reported from the radio base station 10 to the user terminal 20 by the methods described with the above first to third examples.

Also, although, in FIG. 17, USSs are provided in both enhanced PDCCH sets 1 and 2, it is equally possible to provide USSs in only one of enhanced PDCCH sets 1 and 2. Also, it is equally possible not to provide enhanced PDCCH sets 1 and 2. In this case, format information of DCI that is transmitted in USSs in the legacy PDCCH and in USSs in enhanced PDCCHs may be transmitted. Also, the ALs and the number of USS candidates per AL are by no means limited to the ones shown in FIG. 17.

As has been described above, with the blind decoding method according to the present embodiment, the radio base station 10 reports the information for configuring the number of candidates described above with the first to fourth examples, to the user terminal 20, and the user terminal 20 blind-decodes DCI based on the number of search space candidates for the legacy PDCCH and the numbers of search space candidates for enhanced PDCCHs that are configured based on the information for configuring the number of candidates. Consequently, it is possible to configure adequate numbers of search space candidates when DCI is transmitted using at least one of the legacy PDCCH and enhanced PDCCHs, and adjust the number of times of blind decoding adequately.

FIFTH EXAMPLE

The blind decoding method according to a fifth example of the present embodiment will be described with reference to FIG. 24. With the blind decoding method according to the fifth example, as has been described above, enhanced PDCCH sets 1 and 2 (the first and second frequency resource sets), each including and formed with a plurality of PRB pairs (frequency resource units) provided for enhanced PDCCHs, are provided. Here, each PRB pair includes a plurality of eCCEs (enhanced control channel elements), which are the resource allocation units for enhanced PDCCHs. Consequently, enhanced PDCCH sets 1 and 2 each include a plurality of eCCEs allocated to enhanced PDCCHs, and are formed with a plurality of PRB pairs. The radio base station 10 configures enhanced PDCCH sets 1 and 2 for the user terminal 20. Note that the number of enhanced PDCCH sets may be two or greater.

With the blind decoding method according to the fifth example, similar to the first example to the fourth example, the radio base station 10 reports information for configuring the number of candidates, which information is used to configure the user terminal with the numbers of search space candidates with respect to enhanced PDCCH set 1, to the user terminal 20. The user terminal 20 configures the numbers of search space candidates for enhanced PDCCH set 1 based on that information for configuring the number of candidates, determines the search spaces for enhanced PDCCH set 1 based on these numbers of search space candidates, and blind-decodes the DCI.

On the other hand, with the blind decoding method according to the fifth example, unlike the first example to the fourth example, the radio base station 10 does not report information for configuring the number of candidates that is used to configure the numbers of search space candidates with respect to enhanced PDCCH set 2, to the user terminal 20. Instead, the radio base station 10 reports index number information, which shows the index numbers of eCCEs allocated to the search spaces for enhanced PDCCH set 2. The user terminal 20 blind-decodes the DCI based on the index number information reported from the radio base station 10. Here, the index number information may be a pattern that shows combinations of the index numbers of eCCEs allocated to the search spaces for enhanced PDCCH set 2, or may be the index numbers of eCCEs themselves.

Figure 24A:
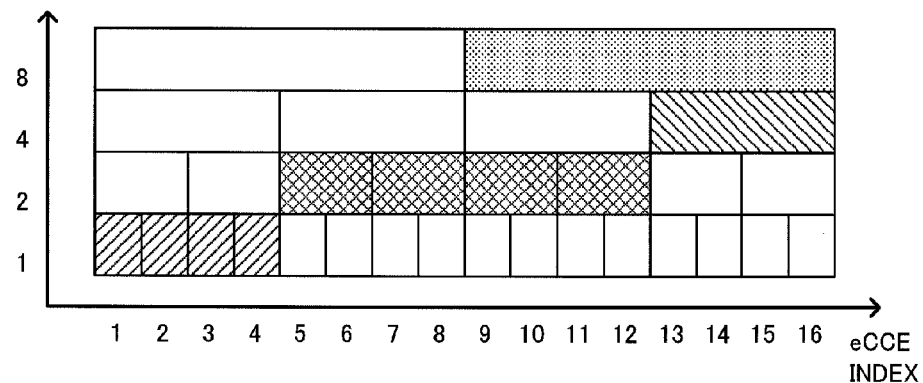
FIG. 24 provides diagrams to show examples of search spaces according to a fifth example.
Figure 24B:
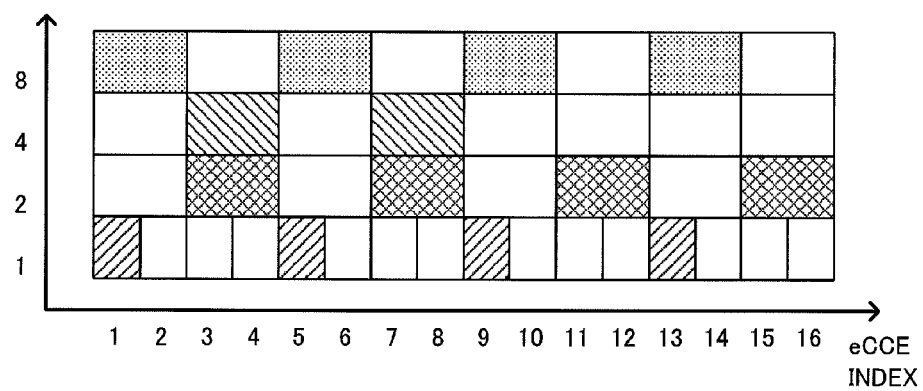

FIG. 24 provides diagrams to show examples of search spaces according to the fifth example. FIG. 24A shows examples of search spaces for enhanced PDCCH set 1, and FIG. 24B shows search spaces for enhanced PDCCH set 2. Note that, in FIGS. 24A and 24B, the aggregation level (AL) shows the number of eCCEs that are aggregated. The search spaces at AL 1 are formed in one-eCCE unit. The search spaces at AL 2 are formed in two-eCCE units. Similarly, the search spaces at AL 4 and AL 8 are formed in four-eCCE units and eight-eCCE units, respectively.

In FIG. 24A, based on the information for configuring the number of candidates reported from the radio base station 10 to the user terminal 20, the number of search space candidates for enhanced PDCCH set 1 is configured per AL. For example, in FIG. 24A, the numbers of search space candidates for enhanced PDCCH set 1 at AL 1, AL 2, AL 4 and AL 8 are configured to "4," "4," "1" and "1," respectively. Here, information for configuring the number of candidates may be any one of the values of the numbers of search space candidates (the first example), the ratios to total numbers of candidates (the second example), pattern information (the third example), and DCI format information (the fourth example). Also, the information for configuring the number of candidates is reported from the radio base station 10 to the user terminal 20 through higher layer signaling such as RRC signaling.

Also, in FIG. 24A, the search space starting position at each AL is determined based on a predetermined hash function. Starting from the position of an index number that is determined based on a predetermined hash function, search spaces at each AL cover a number of consecutive eCCEs that equal the result of multiplication of the number of search space candidates by the number of eCCE aggregations at each AL.

For example, in FIG. 24A, the search space starting positions at AL 1, AL 2, AL 4 and AL 8 are set at index numbers "1," "5," "13" and "9," respectively. In this case, the search spaces at AL 1 become four consecutive eCCEs (4×1) starting from the position of index number "1." Also, the search spaces at AL 2 become eight consecutive eCCEs (4×2) starting from the position of index number "5." Also, the search spaces at AL 3 become four consecutive eCCEs (1×4) starting from the position of index number "13." Also, the search spaces at AL 8 become eight consecutive eCCEs (1×8) starting from the position of index number "9."

As has been described above, search spaces for enhanced PDCCH set 1 are determined based on a starting position, which is determined based on a predetermined hash function, and the number of search space candidates, which is configured based on information for configuring the number of candidates, and are formed with a predetermined number of consecutive eCCEs. These search spaces are suitable for primary set search spaces that are common between all the user terminals 20. This is because generating search spaces randomly by means of a hash function gives all the user terminals an equal opportunity to allocate downlink control channel information. Note that the primary set search spaces may be used as common search spaces (CSSs).

On the other hand, search spaces for enhanced PDCCH set 2 are configured based on index number information that is reported from the radio base station 10 to the user terminal 20. As has been noted above, the index number information may be a pattern to show combinations of the index numbers of eCCEs allocated to the search spaces for enhanced PDCCH set 2, or may be the index numbers of eCCEs themselves. The index number information is reported from the radio base station 10 to the user terminal 20 using higher layer signaling such as RRC signaling. Now, an example of using the above pattern as index number information will be described.

FIG. 24B shows the combinations of eCCEs when the numbers of search space candidates for enhanced PDCCH set 2 at AL 1, AL 2, AL 4 and AL 8 are "4," "4," "1" and "1," respectively. As shown in FIG. 24B, search spaces for enhanced PDCCH set 2 at each AL may not be formed with consecutive eCCEs. The radio base station 10 forms the search spaces for enhanced PDCCH set 2 at each AL with eCCEs that are non-consecutive at least in part, and reports a pattern to show combinations of the eCCE index numbers of these eCCEs to the user terminal 20.

For example, in FIG. 24B, the search spaces at AL 1 are formed with four (4×1) eCCEs having index numbers "1," "5," "9" and "13." Also, the search spaces at AL 2 are formed with eight (4×2) eCCEs having index numbers "3," "4," "7," "8," "11," "12," "15" and "16." Also, the search spaces at AL 4 are formed with four (1×4) eCCEs having index numbers "3," "4," "7" and "8." Also, the search spaces at AL 8 are formed with eight (1×8) eCCEs having index numbers "1," "2," "5," "6," "9," "10," "13," and "14."

In FIG. 24B, the radio base station 10 determines the above combinations of index numbers so that blocking with DCI for other user terminals 20 does not occur, and reports a pattern to represent these combinations to the user terminal 20 as index number information. The user terminal 20 determines the search spaces for each AL in accordance with the combinations of index numbers represented by the reported pattern.

As has been described above, the search spaces for enhanced PDCCH set 2 are determined based on index number information reported from the radio base station 10, and are formed with a predetermined number of consecutive/non-consecutive eCCEs. Search spaces like these are suitable as secondary set search spaces. This is because it is not necessary to secure a predetermined number of consecutive eCCEs, and the occurrence of blocking of DCI between user terminals 20 can be reduced in advance in the radio base station 10. Note that the secondary set search spaces may be used as specific search spaces (USSs) as well.

With the blind decoding method according to the fifth example, the search spaces for each enhanced PDCCH set are configured based on information for configuring the number of candidates or index number information, depending on the purpose of use of the search spaces. Consequently, the search spaces for each enhanced PDCCH set may be formed in an eCCE structure that is suitable for the purpose of use of the search spaces.

Note that, with the blind decoding method according to the fifth example, similar to the first example to the fourth example, the radio base station 10 may report information for configuring the number of candidates, which is used to configure the numbers of search space candidates for the legacy PDCCH, to the user terminal 20. The user terminal 20 configures the numbers of search space candidates for the legacy PDCCH based on the information for configuring the number of candidates reported from the radio base station 10, and blind-decodes the DCI based on the numbers of search space candidates that are configured. Note that, in this case, similar to enhanced PDCCH set 1, search spaces for the legacy PDCCH are determined based on a starting position that is determined based on a predetermined hash function, and the numbers of search space candidates that are configured based on information for configuring the number of candidates, and are formed with a predetermined number of consecutive eCCEs.

(Configuration of Radio Communication System)

The radio communication system according to the present embodiment will be described in detail.

Figure 18:
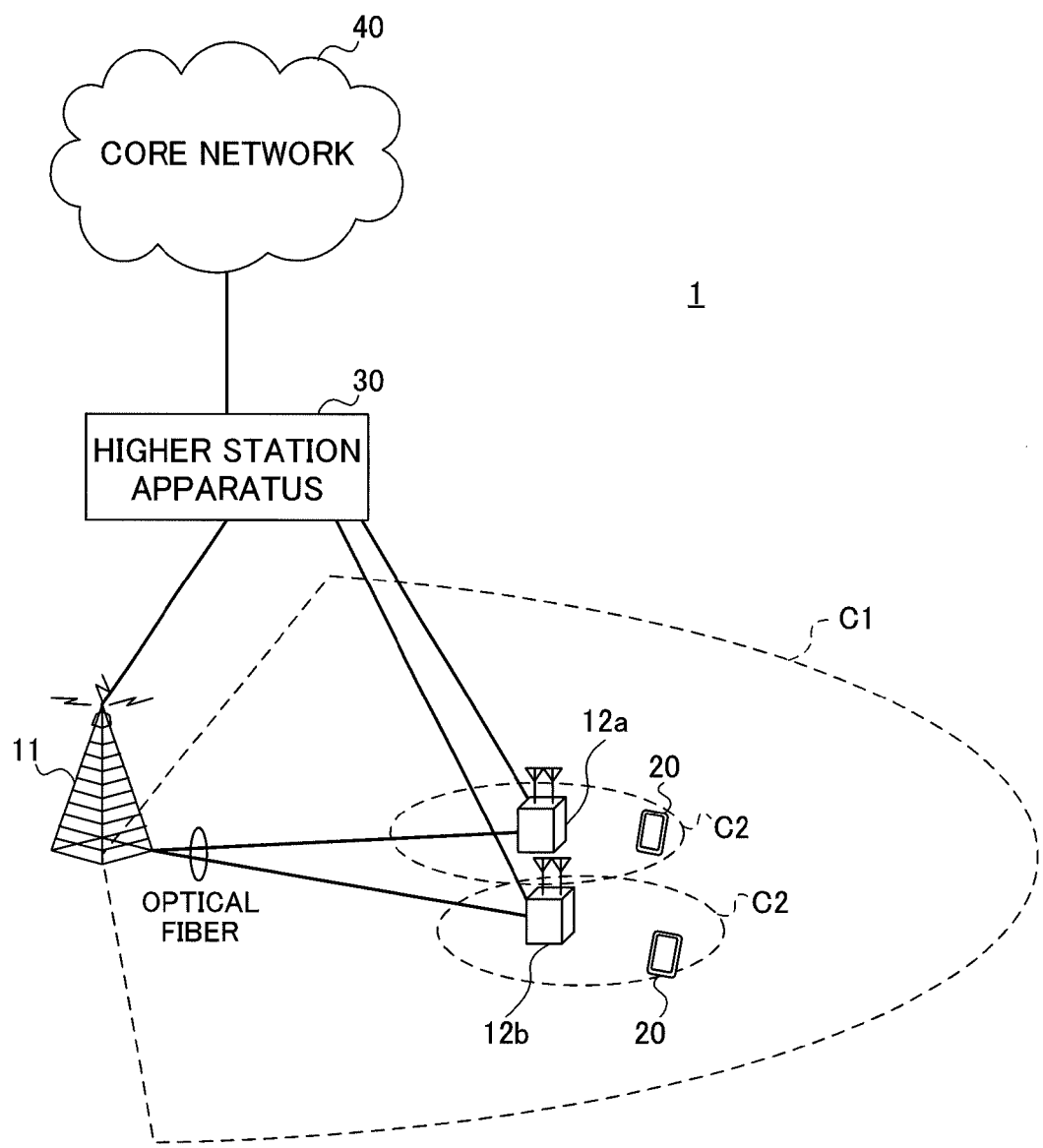
FIG. 18 is a diagram to explain a system structure of a radio communication system according to the present embodiment.

FIG. 18 is a schematic configuration diagram to explain a radio communication system according to the present embodiment. Note that the radio communication system shown in FIG. 18 is a system to accommodate, for example, the LTE system or SUPER 3G. This radio communication system adopts carrier aggregation to group a plurality of fundamental frequency blocks (component carriers), where the system band of the LTE system constitutes one unit. Also, this radio communication system may be referred to as "IMT-Advanced," or may be referred to as "4G," "FRA (Future Radio Access)" and so on.

As shown in FIG. 18, the radio communication system 1 includes a radio base station 11 that forms a macro cell C1, and radio base stations 12a and 12b that form small cells C2, which are placed inside the macro cell C1 and narrower than the macro cell C1. Also, in the macro cell C1 and in each small cell C2, user terminals 20 are placed. The user terminals 20 are configured to be able to perform radio communication with both the radio base station 11 and the radio base stations 12.

Between a user terminal 20 and the radio base station 11, communication is carried out using a carrier of a relatively low frequency band (for example, 2 GHz) and a wide bandwidth (referred to as, for example, "existing carrier," "legacy carrier" and so on). On the other hand, between a user terminal 20 and a radio base station 10, communication is carried out using a carrier of a relatively high frequency band (for example, 3.5 GHz) and a narrow bandwidth (referred to as, for example, "extension carrier," "additional carrier," "capacity carrier," "new carrier type," and so on). Also, the radio base station 11 and each radio base station 12 are connected with each other by wire connection or by wireless connection.

The radio base station 11 and each radio base station 12 are connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limiting. Also, each radio base station 12 may be connected with the higher station apparatus via the radio base station 11.

Note that, the radio base station 11 is a radio base station having a relatively wide coverage, and may be referred to as "eNodeB," "radio base station apparatus," "transmission point" and so on. Also, the radio base stations 12 are radio base stations having local coverages, and may be referred to as "pico base stations," "femto base stations," "home eNodeBs," "RRHs (Remote Radio Heads)," "micro base stations," "transmission points" and so on. Also, when no distinction is made between the radio base stations 11 and 12, these will be both referred to as "radio base station 10." Each user terminal 20 is a terminal that supports various communication schemes such as LTE, LTE-A and so on, and may be both a mobile communication terminal and a fixed communication terminal.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, a system band into bands formed with one or continuous resource blocks, and allowing a plurality of terminals to use mutually different bands.

Here, communication channels to be used in the radio communication system shown in FIG. 18 will be described. Downlink communication channels include a PDSCH (Physical Downlink Shared Channel), which is used by each user terminal 20 on a shared basis, and downlink L1/L2 control channels (PDCCH, PCFICH and PHICH). User data and higher control information are transmitted by the PDSCH. Scheduling information for the PDSCH and the PUSCH and so on is transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel). Also, the scheduling information for the PDSCH and the PUSCH and so on may be transmitted by enhanced PDCCHs (referred to as, for example, "enhanced Physical Downlink Control Channels," "ePDCCHs," "E-PDCCHs," "FDM-type PDCCHs" and so on). The enhanced PDCCHs are frequency-division-multiplexed with the PDSCH, and used to cover the shortage of the capacity of the PDCCH.

Uplink communication channels include the PUSCH (Physical Uplink Shared CHannel) that is used by each user terminal 20 on a shared basis as an uplink data channel, and a PUCCH (Physical Uplink Control CHannel), which is an uplink control channel. User data and higher control information are transmitted by this PUSCH. Also, downlink radio quality information (CQI: Channel Quality Indicator), ACK/NACK and so on are transmitted by the PUCCH.

Figure 19A:
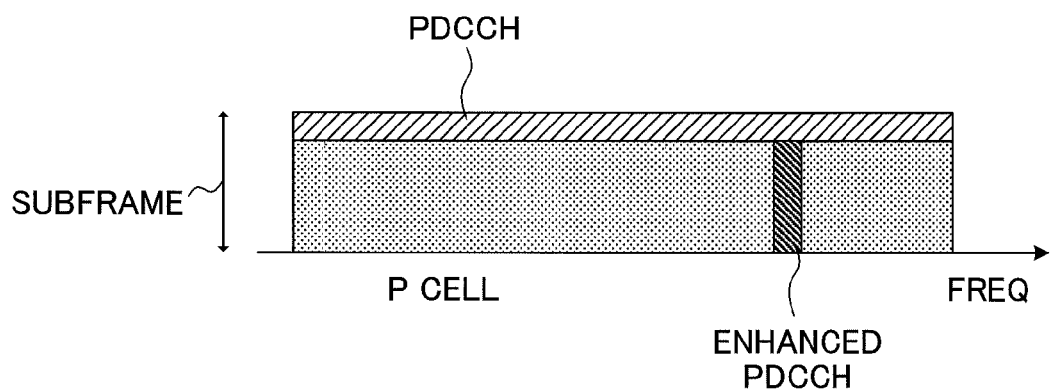
FIG. 19 provides diagrams to explain enhanced PDCCHs used in the radio communication system according to the present embodiment.

Now, enhanced PDCCH that is used in the radio communication system shown in FIG. 18 will be described in detail with reference to FIG. 19. FIG. 19A shows an example of a subframe of the radio base station 11, and FIGS. 19B and 19C each show an example of a subframe of the radio base stations 12. As shown in FIG. 19A, in the radio base station 11, a PDCCH that is placed over maximum three OFDM symbols from the top of the subframe over the entire system band, and an enhanced PDCCH that is frequency-division-multiplexed with the PDSCH from the fourth OFDM symbol onward in the subframe, are used.

Figure 19B:
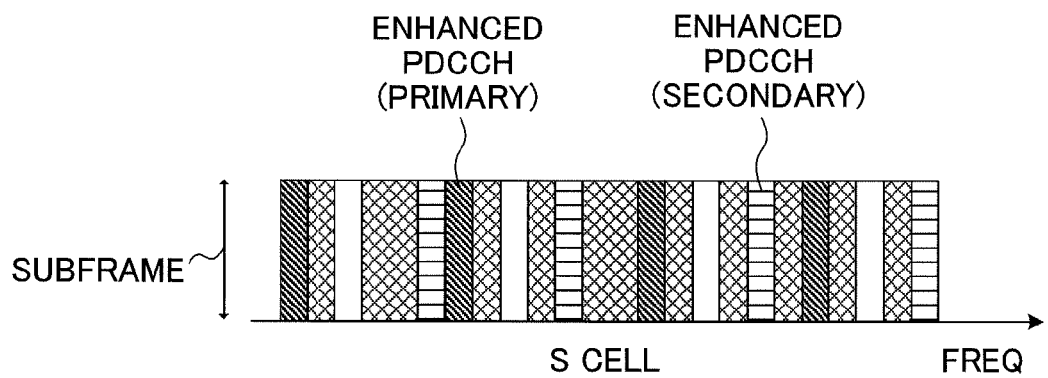
Figure 19C:
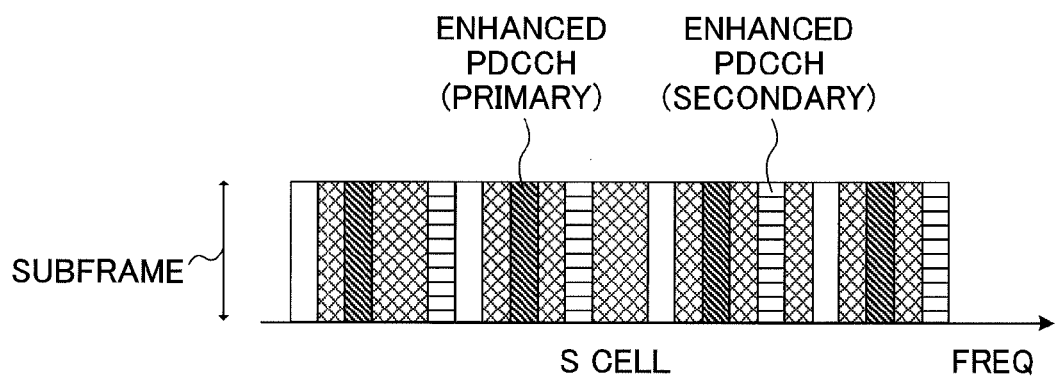

On the other hand, as shown in FIGS. 19B and 19C, the radio base stations 12a and 12b use enhanced PDCCHs that are frequency-division-multiplexed with the PDSCH from the top OFDM symbol of the subframe, and do not use the PDCCH. Note that, as shown in FIGS. 19B and 19C, to prevent interference between the radio base stations 12, in frequency resources where enhanced PDCCHs (primary) are placed in one radio base station 12, muting resources are placed in the other radio base station 12 (see FIG. 19C).

Figure 20:
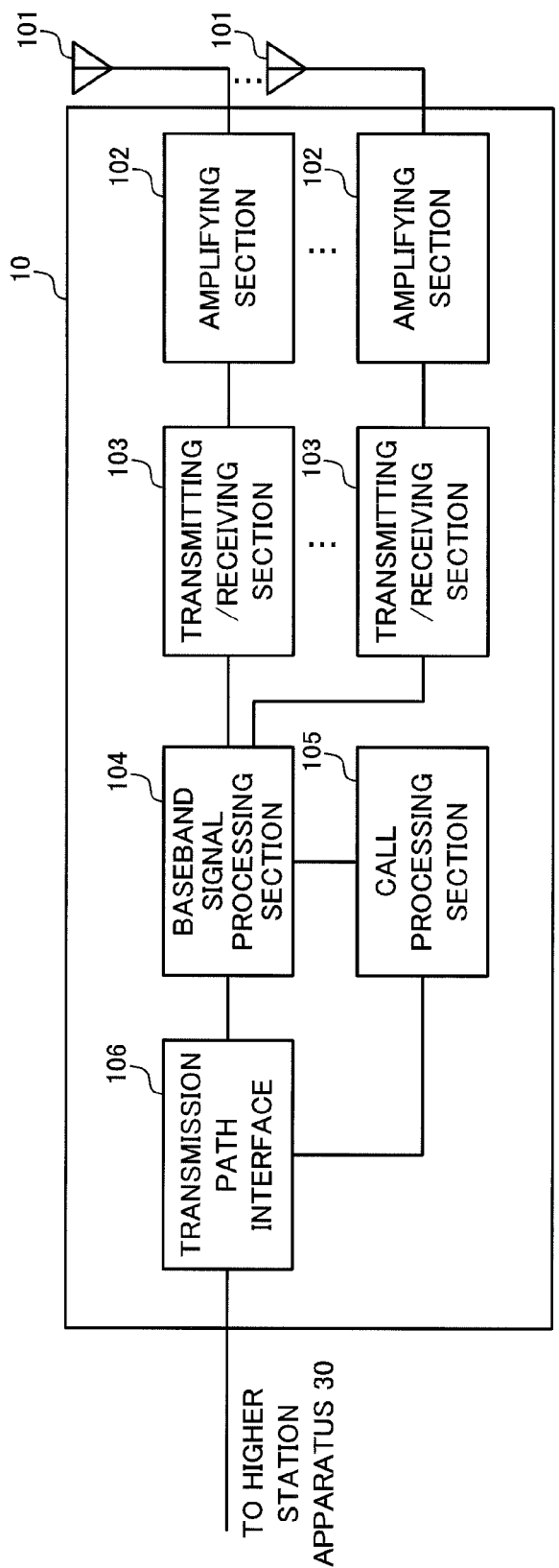
FIG. 20 is a diagram to explain an overall structure of a radio base station according to the present embodiment.

FIG. 20 is a diagram to show an overall structure of a radio base station 10 (which covers the radio base stations 11 and 12) according to the present embodiment. The radio base station 10 includes a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminal 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminals 20, control information for allowing communication in the cell, through a broadcast channel. The information for allowing communication in the cell includes, for example, the uplink or downlink system bandwidth and so on.

Each transmitting/receiving section 103 converts the baseband signals, which have been subjected to precoding and output from the baseband signal processing section 104 on a per antenna basis, into a radio frequency band. The amplifying sections 102 amplify the radio frequency signals having been subjected to frequency conversion, and output the results through the transmitting/receiving antennas 101.

On the other hand, as for data that is transmitted from the user terminal 20 to the radio base station 10 on the uplink, the radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 21:
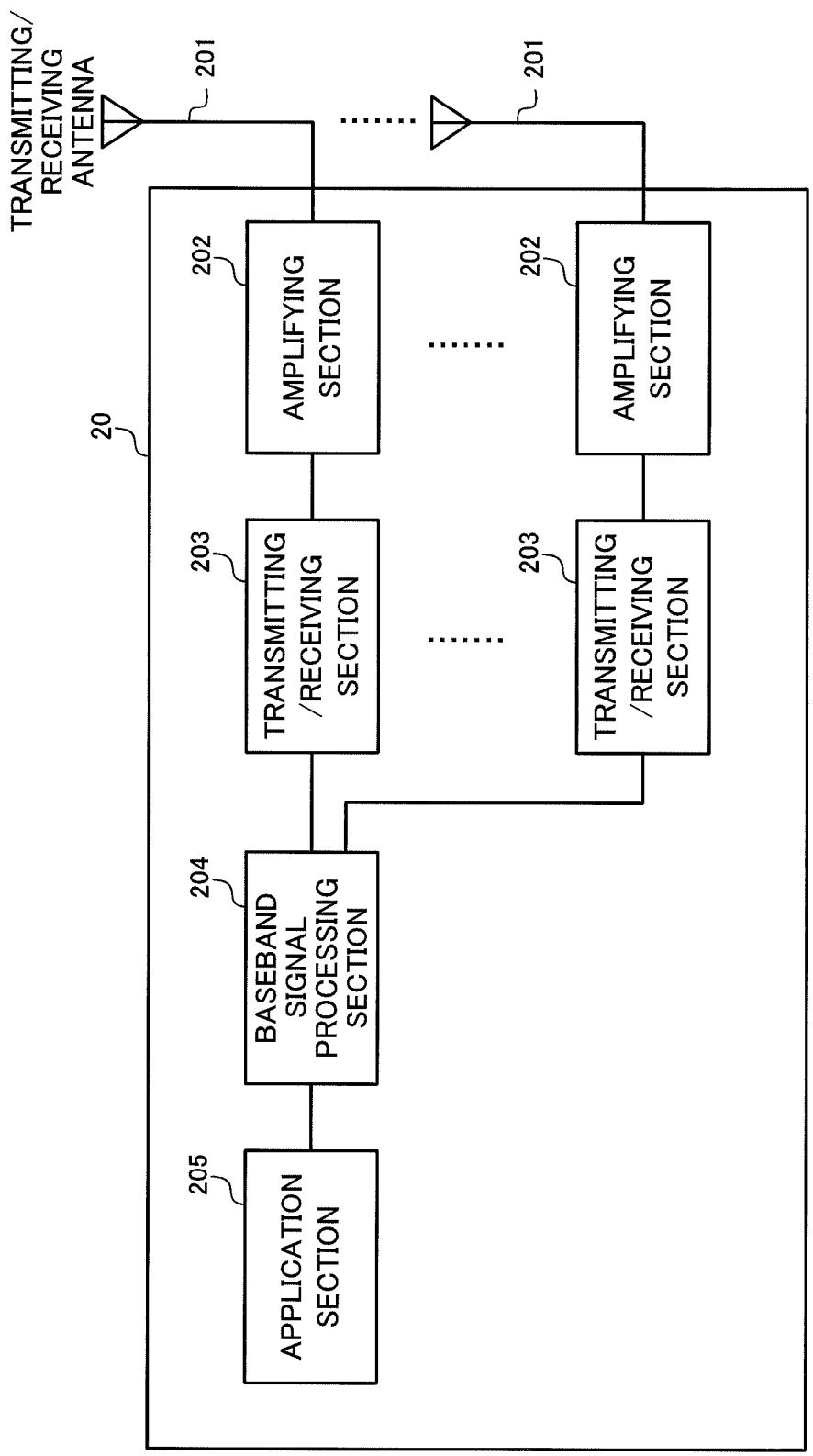
FIG. 21 is a diagram to explain an overall structure of a user terminal according to the present embodiment.

FIG. 21 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204, and an application section 205.

As for downlink data, radio frequency signals that are received in the plurality of transmitting/receiving antennas 201 are each amplified in the amplifying sections 202, and subjected to frequency conversion and converted into baseband signals in the transmitting/receiving sections 203.

The baseband signals are subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205.

Meanwhile, uplink user data is input from the application section 205 into the baseband signal processing section 204. The baseband signal processing section 204 performs a retransmission control (HARQ (Hybrid ARQ)) transmission process, channel coding, precoding, a DFT process, an IFFT process, and so on, and the result is transferred to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the result from the transmitting/receiving antennas 201.

Figure 22:
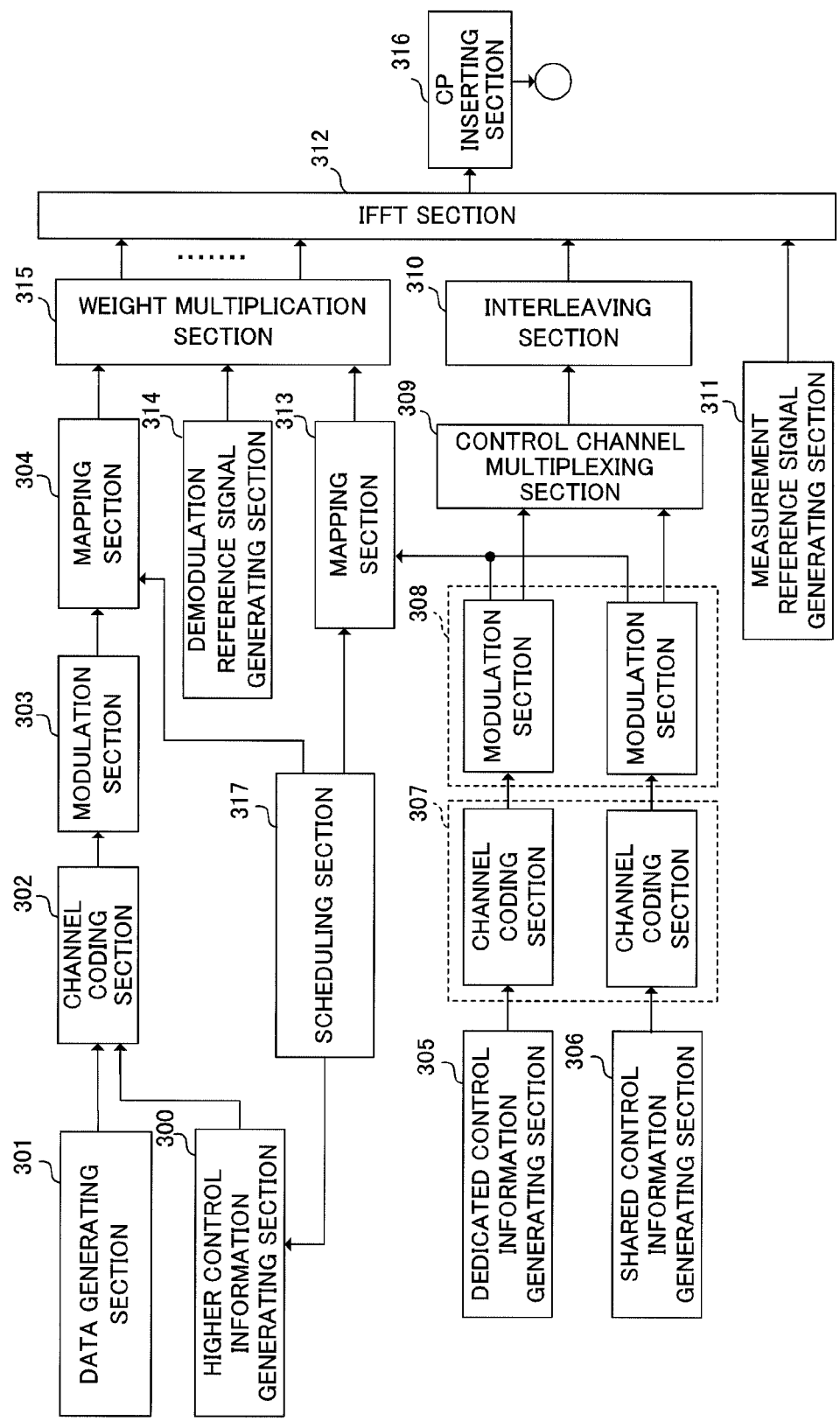
FIG. 22 is a functional configuration diagram of a baseband processing section provided in the radio base station according to the present embodiment, and part of higher layers.

FIG. 22 is a functional configuration diagram of the baseband signal processing section 104 provided in the radio base station 10 according to the present embodiment, and part of higher layers. Note that, although FIG. 22 primarily shows downlink (transmitting) functional configurations, the radio base station 10 may have uplink (receiving) functional configurations as well.

As shown in FIG. 22, the radio base station 10 has a higher control information generating section 300, a data generating section 301, a channel coding section 302, a modulation section 303, a mapping section 304, a dedicated control information generating section 305, a shared control information generating section 306, channel coding sections 307, modulation sections 308, a control channel multiplexing section 309, an interleaving section 310, a measurement reference signal generating section 311, an IFFT section 312, a mapping section 313, a demodulation reference signal generating section 314, a weight multiplication section 315, a CP inserting section 316, and a scheduling section 317. Note that, when the radio base station 10 is a radio base station 12 to form a small cell C2, the control channel multiplexing section 309 and the interleaving section 310 may be omitted.

The higher control information generating section 300 generates higher control information on a per user terminal 20 basis. Also, the higher control information is control information that is sent through higher layer signaling (for example, RRC signaling), and includes, for example, information for configuring the number of candidates. As has been described above, information for configuring the number of candidates refers to information that is used to configure the numbers of search space candidates for the legacy PDCCH and the numbers of search space candidates for enhanced PDCCHs. The generating section and reporting section according to the present invention are formed with the higher control information generating section 300.

With the present embodiment, as shown in FIG. 7A and FIG. 7B, the higher control information generating section 300 may generate the numbers of CSS candidates a and b and the numbers of USS candidates c and d for the legacy PDCCH, and the numbers of USS candidates e and f for enhanced PDCCH set 1, as information for configuring the number of candidates. Note that, when two enhanced PDCCH sets are not provided, the numbers of USS candidates e and f for enhanced PDCCH set 1 need not be generated. Also, as shown in FIG. 8A and FIG. 8B, the higher control information generating section 300 may generate the numbers of CSS candidates and the numbers of USS candidates on a per aggregation level (AL) basis.

Also, as shown in FIG. 9A and FIG. 9B, the higher control information generating section 300 may generate the ratio m of the number of CSS candidates for the legacy PDCCH to the total number of CSS candidates to the total number of CSS candidates, the ratio n of the number of USS candidates for the legacy PDCCH to the total number of USS candidates, and the ratio n' of the number of USS candidates for enhanced PDCCH set 1 to the number of USS candidates for the enhanced PDCCHs, as information for configuring the number of candidates. Note that, when two enhanced PDCCH sets are not provided, the ratio n' needs not be generated. Also, the higher control information generating section 300 may generate the above ratios per aggregation level (AL).

Also, as shown in FIGS. 11 to 16, the higher control information generating section 300 may generate pattern information to show combinations of numbers of CSS candidates and numbers of USS candidates for the legacy PDCCH at each AL and numbers of CSS candidates and numbers of USS candidates for enhanced PDCCH sets 1 and 2 at each AL, as information for configuring the number of candidates. As has been described with reference to FIGS. 11 to 16, the higher control information generating section 300 selects combinations that correspond to various cases (the situation of the user terminal UE and so on), and generates pattern information to represent the selected combinations. Note that, when two enhanced PDCCH sets are not provided, pattern information to represent combinations of numbers of CSS candidates and numbers of USS candidates for the legacy PDCCH at each AL, and numbers of CSS candidates and numbers of USS candidates for enhanced PDCCHs at each AL, may be generated.

Also, as shown in FIG. 17, the higher control information generating section 300 may generate pattern information to represent the DCI formats X, Y and Z of DCI that is transmitted in the USSs for the legacy PDCCH and in the USSs for enhanced PDCCH sets 1 and 2, as information for configuring the number of candidates. Note that, when two enhanced PDCCH sets are not provided, pattern information to represent the DCI format Z needs not be generated.

The data generating section 301 generates downlink user data on a per user terminal 20 basis. The downlink user data generated in the data generating section 301 and the higher control information generated in the higher control information generating section 300 are input in the channel coding section 302 as downlink data to be transmitted in the PDSCH. The channel coding section 302 performs channel coding of the downlink data for each user terminal 20 in accordance with the coding rate determined based on feedback information from each user terminal 20. The modulation section 303 modulates the downlink data having been subjected to channel coding, in accordance with the modulation scheme determined based on feedback information from each user terminal 20. The mapping section 304 maps the modulated downlink data in accordance with commands from the scheduling section 317.

The dedicated control information generating section 305 generates dedicated control information, which is UE-specific downlink control information, per user terminal 20. The dedicated control information includes PDSCH allocation information (DL grants, DCI formats 1A and 1C and so on), and PUSCH allocation information (UL grants, DCI formats 0, 2, and 4 and so on). The shared control information generating section 306 generates shared (cell-specific) control information that is shared between cells. The cell-shared control information includes, for example, control information for DCI formats 1A and 1C.

The dedicated control information generated in the dedicated control information generating section 305 and the shared control information generated in the shared control information generating section 306 are input in the channel coding sections 307 as downlink control information to be transmitted in the legacy PDCCH or enhanced PDCCHs. The channel coding sections 307 perform channel coding of the downlink control information received as input, in accordance with the coding rate designated by a scheduling section 317, which will be described later. The modulation sections 308 modulate the downlink control information having been subjected to channel coding, in accordance with the modulation scheme designated by the scheduling section 317.

Here, the downlink control information to be transmitted in the legacy PDCCH is input from the modulation sections 308 into the control channel multiplexing section 309 and multiplexed. The downlink control information multiplexed in the control channel multiplexing section 309 is interleaved in the interleaving section 310. The interleaved downlink control information is input in the IFFT section 312 with measurement reference signals (CSI-RSs: Channel State Information-Reference Signals, CRSs: Cell-specific Reference Signals, and so on) generated in the measurement reference signal generating section 311.

Meanwhile, the downlink control information that is transmitted in the enhanced PDCCHs is input from the modulation sections 308 into the mapping section 313. The mapping section 313 maps the downlink control information in predetermined allocation units (for example, in eCCE units or in eREG units) in accordance with commands from the scheduling section 317, which will be described later. The mapping section 313 may map the downlink control information using distributed mapping in accordance with commands from the scheduling section 317, or may map the downlink control information using localized mapping.

The mapped downlink control information is input in the weight multiplication section 315 with the downlink data to be transmitted in the PDSCH (that is, the downlink data that is mapped in the mapping section 304) and the demodulation reference signals (DM-RSs) generated in the demodulation reference signal generating section 314. The weight multiplication section 315 multiplies the downlink data to be transmitted by the PDCSH, the downlink control information to be transmitted by the enhanced PDCCHs and the demodulation reference signals, by user terminal 20-specific precoding weights and pre-encodes them. The transmission data having been subjected to precoding is input into the IFFT section 312, and converted from frequency domain signals into time sequence signals through an inverse fast Fourier transform. Cyclic prefixes (CPs) to function as guard intervals are inserted in the output signals from the IFFT section 312 by the CP inserting section 316, and the signals are output to the transmitting/receiving sections 103.

The scheduling section 317 schedules the downlink data to be transmitted by the PDSCH, the downlink control information to be transmitted by the enhanced PDCCHs and the downlink control information to be transmitted by the PDCCH. To be more specific, the scheduling section 317 allocates radio resources based on command information from the higher station apparatus 30 and feedback information from each user terminal 20 (for example, CSI (Channel State Information), which includes CQIs (Channel Quality Indicators) and RIs (Rank Indicators)).

Note that the scheduling section 317 may command the mapping section 304 to map the downlink control information using distributed mapping, or may command the mapping section 304 to map the downlink control information using localized mapping. Also, whether or not to use distributed mapping or localized mapping may be changed per enhanced PDCCH set. Also, the scheduling section 317 may apply localized mapping with respect to the dedicated control information generated in the dedicated control information generating section 305, and apply distributed mapping to the shared control information generated in the shared control information generating section 306. This is because localized mapping which can achieve frequency scheduling gain is suitable for dedicated control information, while distributed mapping which can achieve frequency diversity gain is suitable for shared control information.

Also, the scheduling section 317 may determine the aggregation levels of the resource allocation units (CCEs) for the downlink control information to be transmitted by the PDCCH and the resource allocation units (eCCEs and so on) for the downlink control information to be transmitted by the enhanced PDCCHs, based on feedback information from the user terminal 20. Also, as for search spaces where downlink control information can be mapped, the number of candidates is determined in advance, per aggregation level of the downlink control information allocation units (CCEs, eCCEs and so on). Consequently, the scheduling section 317 determines the search spaces from the candidates determined in advance, and may indicate these to the mapping sections 304 and 313.

Note that, in the fifth example of the present embodiment shown in FIG. 24, the higher control information generating section 300 may generate information for configuring the number of candidates that is used to configure the numbers of search space candidates for enhanced PDCCH set 1, and also generate index number information to represent the index numbers of enhanced control channel elements (eCCEs) to be allocated to the search spaces for enhanced PDCCH set 2.

Figure 23:
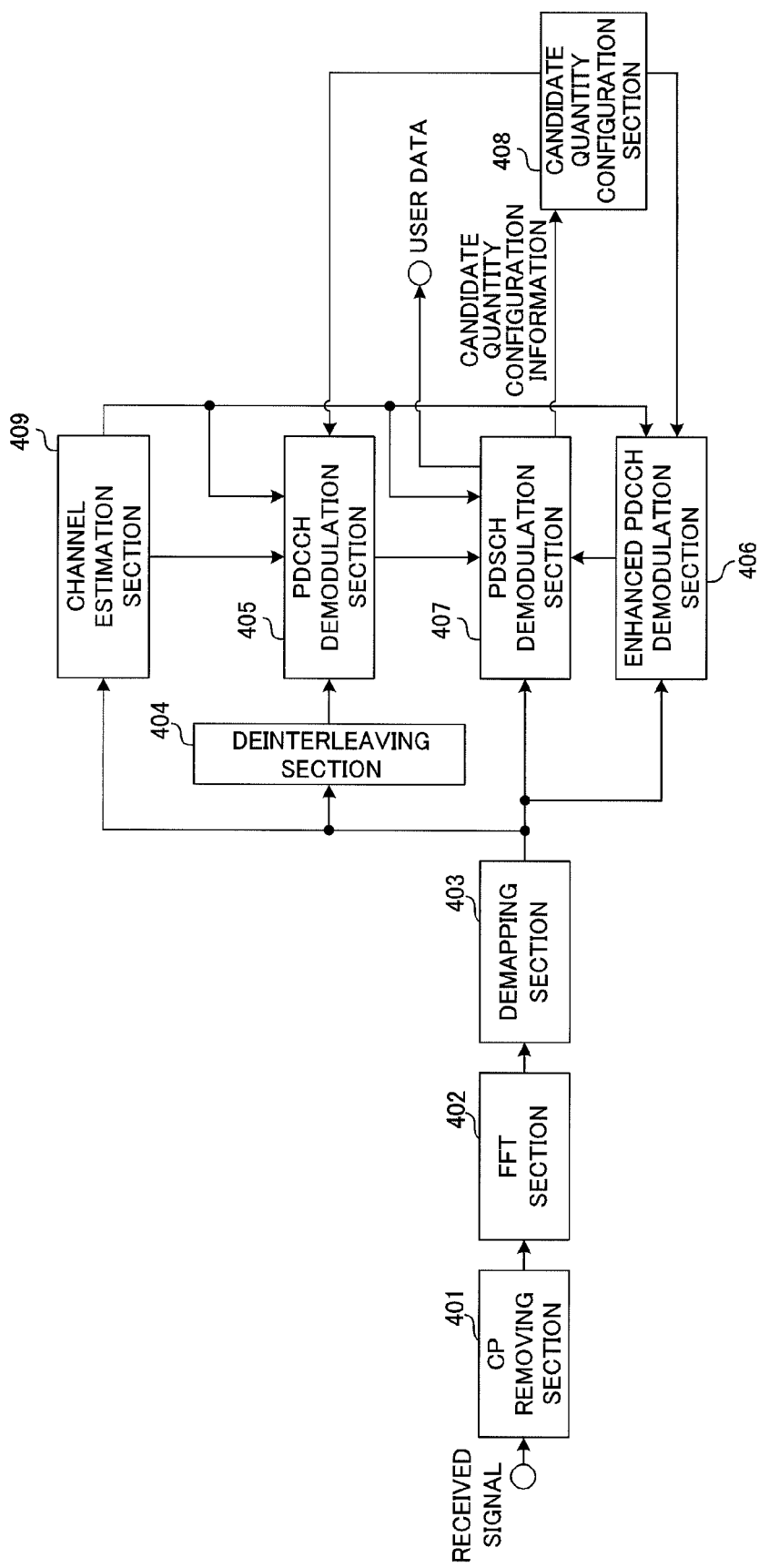
FIG. 23 is a functional configuration diagram of a baseband processing section provided in the user terminal according to an embodiment, and part of higher layers.

FIG. 23 is a functional configuration diagram of the baseband signal processing section 204 provided in the user terminal 20 and part of higher layers. Note that, although FIG. 23 primarily shows downlink (receiving) functional configurations, the user terminal 20 may have uplink (transmitting) functional configurations as well. The user terminal 20 has a CP removing section 401, an FFT section 402, a demapping section 403, a deinterleaving section 404, a PDCCH demodulation section 405, an enhanced PDCCH demodulation section 406, a PDSCH demodulation section 407, a candidate quantity configuration section 408 and a channel estimation section 409, as downlink functional configurations.

Downlink signals received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) on the downlink signals, converts the time domain signals into frequency domain signals and input these signals in the demapping section 403. The demapping section 403 demaps the downlink signals. Note that the demapping process in the demapping section 403 is performed based on higher control information that is received as input from the application section 205. The downlink control information that is output from the demapping section 403 is deinterleaved in the deinterleaving section 404.

The PDCCH demodulation section 405 performs blind decoding, demodulation, channel decoding and so on of the downlink control information (DCI) output from the deinterleaving section 404, based on the result of channel estimation in the channel estimation section 409, which will be described later. To be more specific, the PDCCH demodulation section 405 blind-decodes the CSSs based on the number of CSS candidates for the legacy PDCCH configured by the candidate quantity configuration section 408, which will be described later, and acquires the shared control information. Also, the PDCCH demodulation section 405 blind-decodes the USSs based on the number of USS candidates for the legacy PDCCH configured by the candidate quantity configuration section 408, which will be described later, and acquires the dedicated control information.

The enhanced PDCCH demodulation section 406 performs blind decoding, demodulation, channel decoding and so on of the downlink control information (DCI) output from the demapping section 403, based on the result of channel estimation in the channel estimation section 409, which will be described later. To be more specific, the enhanced PDCCH demodulation section 406 blind-decodes the CSSs based on the number of CSS candidates for the enhanced PDCCHs configured by the candidate quantity configuration section 408, which will be described later, and acquires the shared control information. Also, the enhanced PDCCH demodulation section 406 blind-decodes the USSs based on the number of USS candidates for the enhanced PDCCHs configured by the candidate quantity configuration section 408, which will be described later, and acquires the dedicated control information.

The PDSCH demodulation section 407 performs demodulation, channel decoding and so on of the downlink data output from the demapping section 403, based on the result of channel estimation in the channel estimation section 409, which will be described later. To be more specific, the PDSCH demodulation section 407 demodulates the PDSCH allocated to the user terminal 20 based on the dedicated control information (for example, downlink scheduling information such as DL grants) acquired in the PDCCH demodulation section 405 or in the enhanced PDCCH demodulation section 406, and acquires the downlink data (downlink user data and higher control information) for the user terminal 20.

With the present embodiment, the candidate quantity configuration section 408 configures the numbers of search space candidates for the legacy PDCCH based on information for configuring the number of candidates that is reported as higher control information, and inputs them in the PDCCH demodulation section 405. Also, the candidate quantity configuration section 408 configures the numbers of search space candidates for the enhanced PDCCHs based on information for configuring the number of candidates that is reported as higher control information, and inputs them in the enhanced PDCCH demodulation section 406. The blind decoding section of the present invention is formed with the PDCCH demodulation section 405, the enhanced PDCCH demodulation section 406, and the candidate quantity configuration section 408.

To be more specific, as shown in FIG. 7A, the candidate quantity configuration section 408 may configure the numbers of CSS candidates a and b and the numbers of USS candidates c and d for the legacy PDCCH, and the numbers of USS candidates e and f for enhanced PDCCH set 1, reported as information for configuring the number of candidates, on an as-is basis. Meanwhile, the candidate quantity configuration section 408 may configure the number of CSS candidates for the enhanced PDCCH by subtracting the numbers of CSS candidates a and b that are reported, from total numbers of CSS candidates (for example, "4" at AL 4 and "8" at AL 8). Also, the candidate quantity configuration section 408 may configure the numbers of CSS candidates for enhanced PDCCH set 2 by subtracting the numbers of USS candidates c and d and the numbers of USS candidates e and f that are reported respectively, from total numbers of USS candidates (for example, "6" at AL 1 and AL 2, and "2" at AL 4 and AL 8).

Also, as shown in FIG. 9A, the candidate quantity configuration section 408 may calculate the numbers of CSS candidates for the legacy PDCCH and for enhanced PDCCHs based on the result of multiplying total numbers of CSS candidates (here, "4" at AL 4 and "2" at AL 8) by the ratio m reported from the radio base station 10. Also, the candidate quantity configuration section 408 may calculate the numbers of USS candidates for the legacy PDCCH and for enhanced PDCCHs based on the result of multiplying total number of USS candidates (here, "6" at AL 1 and AL2, and "2" at AL 8) by the ratio n reported from the radio base station 10. Also, the candidate quantity configuration section 408 may calculate the numbers of USS candidates for enhanced PDCCH sets 1 and 2 based on the result of multiplying the multiplication result by the ratio n, further by the ratio n'.

Also, as shown in FIGS. 11 to 16, the candidate quantity configuration section 408 may configure the numbers of CSS candidates and the numbers of USS candidates in accordance with the combinations associated with pattern information reported from the radio base station 10.

Also, as shown in FIG. 17, the candidate quantity configuration section 408 may input DCI formats that are designated by means of format information reported from the radio base station 10, in the enhanced PDCCH demodulation section 406. In this case, the candidate quantity configuration section 408 may increase and configure the numbers of USS candidates for the legacy PDCCH and the numbers of USS candidates for enhanced PDCCH sets 1 and 2 in accordance with the decrease of the number of formats that should be blind-decoded.

The channel estimation section 409 performs channel estimation using demodulation reference signals (DM-RSs), measurement reference signals (CRSs, CSI-RSs) and so on. The channel estimation section 409 outputs the result of channel estimation by the measurement reference signals (CRSs and CSI-RSs) to the PDCCH demodulation section 406. Meanwhile, the channel estimation section 409 outputs the result of channel estimation by the demodulation reference signals (DM-RSs) to the PDSCH demodulation section 405 and the enhanced PDCCH demodulation section 406. By means of this demodulation using user terminal 20-specific demodulation reference signals (DM-RSs), it is possible to achieve beam-forming gain with respect to the PDSCH and enhanced PDCCHs.

Note that, with the fifth example of the present embodiment shown in FIG. 24, the enhanced PDCCH demodulation section 406 may determine a predetermined number of consecutive enhanced control channel elements (eCCEs) as search spaces for enhanced PDCCH set 1 and blind-decode the DCI, based on the numbers of search space candidates for enhanced PDCCH set 1 (the number of CSS candidates and/or the number of USS candidates) configured by the candidate quantity configuration section 408, which will be described later, and a starting position that is determined using a predetermined hash function.

Also, with the fifth example of the present embodiment shown in FIG. 24, the enhanced PDCCH demodulation section 406 may determine search spaces for enhanced PDCCH set 2 based on index number information that represents the index numbers of eCCEs allocated to the search spaces for enhanced PDCCH set 2, and blind-decode the DCI. In this case, the index number information is demodulated in the PDSCH demodulation section 407 as higher layer control information, and then input in the enhanced PDCCH demodulation section 406.

As has been described above, with the radio communication system 1 according to the present embodiment, the radio base station 10 reports information for configuring the number of candidates to the user terminal 20, and the user terminal 20 blind-decodes the DCI based on the numbers of search space candidates for the legacy PDCCH and the numbers of search space candidates for enhanced PDCCHs that are configured based on the information for configuring the number of candidates. Consequently, it is possible to configure adequate numbers of search space candidates when DCI is transmitted using at least one of the legacy PDCCH and enhanced PDCCHs, and adjust the number of times of blind decoding adequately.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-109900, filed on May 11, 2012, and No. 2012-171243, filed on Aug. 1, 2012, including the specification, drawings, and abstract, is incorporated herein by reference in its entirety.

The invention claimed is:

1. A user terminal that decodes downlink control information transmitted from a radio base station using an enhanced downlink control channel that is frequency-division-multiplexed with a downlink shared data channel, the user terminal comprising:
  a receiver that receives, from the radio base station, information for configuring a number of candidates that is used to configure the user terminal with a number of search space candidates for the enhanced downlink control channel; and
  a processor that decodes the downlink control information based on the number of search space candidates for the enhanced downlink control channel that is configured for each aggregation level based on the information for configuring the number of candidates,
  wherein the enhanced downlink control channel is configured with a frequency resource set including a plurality of PRB (Physical Resource Block) pairs for the enhanced downlink control channel, the number of search space candidates for the enhanced downlink control channel is a number of specific search space candidates for the frequency resource set, and when a plurality of frequency resource sets for the user terminal to monitor are configured in a given cell, numbers of specific search space candidates for the respective frequency resource sets are configured independently and a total number of the specific search space candidates for the respective frequency resource sets at each aggregation level is equal to or less than a total number of specific search space candidates at each aggregation level for Release 10 or earlier versions.

2. The user terminal according to claim 1, wherein the frequency resource set comprises two frequency resource sets.

3. The user terminal according to claim 2, wherein out of PRB pairs that make up the two frequency resource sets, one PRB pair is mapped with the downlink control information in a distributed manner and another PRB pair is mapped with the downlink control information in a localized manner.

4. The user terminal according to claim 2, wherein at a given aggregation level, out of PRB pairs that make up the two frequency resource sets, a number of specific search space candidates for one of the frequency resource sets is set to be larger than a number of specific search space candidates for another frequency resource set.

5. The user terminal according to claim 1, wherein the receiver receives the information for configuring the number of candidates by higher layer signaling.

6. A decoding method for a user terminal to decode downlink control information transmitted from a radio base station using an enhanced downlink control channel that is frequency-division-multiplexed with a downlink shared data channel, the decoding method comprising:
  receiving, from the radio base station, information for configuring a number of candidates that is used to configure the user terminal with a number of search space candidates for the enhanced downlink control channel; and
  decoding the downlink control information based on the number of search space candidates for the enhanced downlink control channel that is configured for each aggregation level based on the information for configuring the number of candidates,
  wherein the enhanced downlink control channel is configured with a frequency resource set including a plurality of PRB (Physical Resource Block) pairs for the enhanced downlink control channel, the number of search space candidates for the enhanced downlink control channel is a number of specific search space candidates for the frequency resource set, and when a plurality of frequency resource sets for the user terminal to monitor are configured in a given cell, numbers of specific search space candidates for the respective frequency resource sets are configured independently and a total number of the specific search space candidates for the respective frequency resource sets at each aggregation level is equal to or less than a total number of specific search space candidates at each aggregation level for Release 10 or earlier versions.

7. A radio base station transmitting downlink control information to a user terminal using an enhanced downlink control channel that is frequency-division-multiplexed with a downlink shared data channel, the radio base station comprising:
  a processor that generates information for configuring a number of candidates that is used to configure the user terminal with a number of search space candidates for the enhanced downlink control channel for each aggregation level; and
  a transmitter that transmits to the user terminal the information for configuring the number of candidates generated by the processor,
  wherein the enhanced downlink control channel is configured with a frequency resource set including a plurality of PRB (Physical Resource Block) pairs for the enhanced downlink control channel, the number of search space candidates for the enhanced downlink control channel is a number of specific search space candidates for the frequency resource set, and when a plurality of frequency resource sets for the user terminal to monitor are configured in a given cell, numbers of specific search space candidates for the respective frequency resource sets are configured independently and a total number of the specific search space candidates for the respective frequency resource sets at each aggregation level is equal to or less than a total number of specific search space candidates at each aggregation level for Release 10 or earlier versions.

8. A radio communication system comprising: a radio base station that transmits downlink control information using an enhanced downlink control channel that is frequency-division-multiplexed with a downlink shared data channel; and a user terminal that receives the downlink control information from the radio base station,
  the radio base station comprising:
    a first processor that generates information for configuring a number of candidates that is used to configure the user terminal with a number of search space candidates for the enhanced downlink control channel for each aggregation level; and a transmitter that transmits to the user terminal the information for configuring the number of candidates generated by the first processor, and the user terminal comprising:

a receiver that receives, from the radio base station, the information for configuring the number of candidates that is used to configure the user terminal with the number of search space candidates for the enhanced downlink control channel; and a second processor that decodes the downlink control information based on the number of search space candidates for the enhanced downlink control channel that is configured for each aggregation level based on the information for configuring the number of candidates, and wherein the enhanced downlink control channel is configured with a frequency resource set including a plurality of PRB (Physical Resource Block) pairs for the enhanced downlink control channel, the number of search space candidates for the enhanced downlink control channel is a number of specific search space candidates for the frequency resource set, and when a plurality of frequency resource sets for the user terminal to monitor are configured in a given cell, numbers of specific search space candidates for the respective frequency resource sets are configured independently and a total number of the specific search space candidates for the respective frequency resource sets at each aggregation level is equal to or less than a total number of specific search space candidates at each aggregation level for Release 10 or earlier versions.

* * * * *